US007010022B2

(12) United States Patent
Sousa et al.

(10) Patent No.: US 7,010,022 B2
(45) Date of Patent: Mar. 7, 2006

(54) SPREAD SPECTRUM RECEIVER

(75) Inventors: Elvino S. Sousa, Tokyo (JP); Ryuji Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 806 days.

(21) Appl. No.: 10/017,217

(22) Filed: Oct. 23, 2001

(65) Prior Publication Data

US 2002/0131480 A1 Sep. 19, 2002

(30) Foreign Application Priority Data

Oct. 24, 2000 (JP) ............................. 2000-363847

(51) Int. Cl.
*H04B 1/69* (2006.01)

(52) U.S. Cl. ....................................... 375/149; 375/150

(58) Field of Classification Search .................. 375/75, 375/39, 2.2, 2.1, 200, 1, 136, 316, 150, 147, 375/149, 219, 346, 345, 206, 208, 325, 371; 455/315, 324, 314, 333, 323, 575, 135, 138, 455/234.1, 250.1, 131, 311, 339, 150.1, 180.1, 455/255, 188.1, 189.1, 190.1; 370/355, 204, 370/500, 516, 342, 350; 380/34

See application file for complete search history.

(56) References Cited

U.S. PATENT DOCUMENTS

| | | | | | |
|---|---|---|---|---|---|
| 4,538,281 | A | * | 8/1985 | Rajan | 380/31 |
| 4,736,390 | A | * | 4/1988 | Ward et al. | 375/316 |
| 4,888,788 | A | * | 12/1989 | Teranishi et al. | 375/141 |
| 5,132,985 | A | * | 7/1992 | Hashimoto et al. | 375/151 |
| 5,550,811 | A | * | 8/1996 | Kaku et al. | 370/342 |
| 5,774,493 | A | * | 6/1998 | Ross | 375/142 |
| 5,898,665 | A | * | 4/1999 | Sawahashi et al. | 370/342 |
| 5,940,433 | A | * | 8/1999 | Sawahashi et al. | 375/149 |
| 5,956,328 | A | * | 9/1999 | Sato | 370/335 |
| 6,029,052 | A | * | 2/2000 | Isberg et al. | 455/131 |
| 6,445,726 | B1 | * | 9/2002 | Gharpurey | 375/136 |
| 6,484,042 | B1 | * | 11/2002 | Loke | 455/550.1 |
| 6,704,349 | B1 | * | 3/2004 | Masenten | 375/219 |
| 6,823,181 | B1 | * | 11/2004 | Kohno et al. | 455/324 |
| 6,850,558 | B1 | * | 2/2005 | Eerola et al. | 375/150 |

OTHER PUBLICATIONS

A 2-GHz wide-band direct conversion receiver for WCDMA applications; Parssinen, A. et al; □□Solid-State Circuits, IEEE Journal of , vol.: 34 , Issue: 12 , Dec. 1999; pp.: 1893-1903.*

Analysis and design of a frequency-hopped spread-spectrum transceiver for wireless personal communications□□Min, J.S.; Samueli, H.; Vehicular Technology, IEEE Transactions on , vol.: 49 , Issue: 5 , Sep. 2000 □□pp. :1719-1731.*

A 2-GHz wide-band direct conversion receiver for WCDMA applications□□Parssinen, A. et al; Solid-State CIrcuits, IEEE Journal of□□vol. 34, Issue 12, Dec. 1999 Pages: 1893-1903.*

* cited by examiner

*Primary Examiner*—Jay K. Patel
*Assistant Examiner*—Jacob Meek
(74) *Attorney, Agent, or Firm*—Finnegan, Henderson, Farabow, Garrett & Dunner, L.L.P.

(57) ABSTRACT

The spread spectrum receiver employs circuits based on direct conversion techniques. These circuits enable realization of spread spectrum receivers of greatly reduced complexity and of much higher chip rates that can be implemented with the standard approach of a fully digital receiver. With these circuits, the digital processing is performed at the data symbol rate and not at a multiple of the chip rate that is customary in state-of-the art spread spectrum and CDMA receiver design.

37 Claims, 18 Drawing Sheets

210A

SPREAD SPECTRUM RECEIVER

BACKGROUND OF THE INVENTION

1. Field of the Invention

The present invention relates to a spread spectrum receiver for a software radio, more particularly to circuits for the analog despreading and direct conversion of a direct sequence radio-frequency (RF) spread spectrum signal based on a FET wide-band direct-conversion circuit and to circuits for PN (pseudo random noise) code synchronization and despreading for different types of direct sequence spread spectra.

2. Description of the Related Art

The basic concept of a software radio is to utilize as much digital processing as possible so that the radio can be easily re-configured to receive signals of different formats, i.e., different modulation, under software control. The radio is simplified greatly if a single stage of RF down-conversion is utilized. Recently novel circuits for direct conversion based on the utilization of FET based square-law detectors have been proposed (refer to document [1], and [2],:

[1] International Application No. PCT/JP00/03521 M. Abe, N. Sasho, D. Krupezevic, and V. Brankovic, [2] WO99/33166 ('99. Jul. 1). These circuits enable the realization of direct conversion circuits with much higher bandwidth and linearity than previously possible.

The use of a direct conversion circuit in the context of a direct sequence spread spectrum receiver has advantages far greater than the above advantages of a single stage converter. In addition to the single stage converter, the direct conversion circuit effectively acts as an analog correlator. This will result in a large reduction in the required processing speed for a spread spectrum receiver and the associated reduction in power consumption.

FIG. 1 is a block diagram of a conventional digital direct sequence spread spectrum receiver.

The direct sequence spread spectrum receiver 10 of FIG. 1 comprises a receiver antenna 11, an RF filter 12, a multi-stage down converter 13, an RF front-end noise reduction filter 14, a sample and analog to digital (A/D) converter 15, a PN code synchronization and tracking circuit 16, and a Rake receiver (demodulator) 17.

As shown in FIG. 1, the typical implementation of a direct sequence spread spectrum receiver 10 includes the RF front-end noise reduction filter 14, followed by the sampler and A/D converter 15 operating at a frequency of some multiple of the chip rate, e.g., 8 times the chip rate. For wide-band CDMA (Code Division Multiple Access) at a 3× bandwidth, this chip rate is equal to 8×3.84=30.72 MHz. For a higher bandwidth, the rate can easily be greater than 100 MHz. The receiver runs the PN code synchronization and tracking circuits 16 and performs despreading digitally at these rates.

If the receiver utilizes antenna diversity, or a digital beam-forming array, then this circuitry is repeated at each of the array elements. For a large spreading bandwidth, the circuit complexity and the associated power consumption becomes large.

It becomes advantageous to design a receiver that operates at clock frequencies that are multiples of the symbol rate rather than the chip rate. This is possible if the despreading is effectively implemented in an analog form.

SUMMARY OF THE INVENTION

A first object of the present invention is to provide a spread spectrum receiver enabling the design of power efficient spread spectrum systems with a very high chip rate, where the complexity of the circuit is independent of the chip rate and capable of reducing the associated power consumption.

A second object of the present invention is to provide a spread spectrum receiver for a software radio capable of performing the digital processing at the data symbol rate instead of the chip rate.

According to the first aspect of the present invention, there is provided a spread spectrum receiver receiving a spread spectrum signal spread in bandwidth by a predetermined spreading code, comprising a local oscillator for outputting a local signal with a predetermined frequency, a local spreading code generating means for generating a local spreading code according to the spreading code of received signal, and a direct conversion circuit for generating a reference local signal based on the local signal from the local oscillator and the local spreading code from the local spreading generating means, generating two signals having a phase difference based on the received signal and the reference local signal, and despreading based on two signals having a phase difference.

Preferably, the direct conversion circuit comprises a multiplier for multiplying the local signal by the local spreading code and outputting the same as the reference local signal, a first phase shifter for shifting the received signal in phase, a second phase shifter for shifting the reference local signal in phase, a first adder for adding the reference local signal and an output signal of the first shifter, a second adder for adding the received signal and an output signal of the second phase shifter, a first detector for detecting a signal level of an output of the first adder, and a second detector for detecting a signal level of an output of the second adder.

Alternatively, the direct conversion circuit comprises a modulator for modulating the local signal by the local spreading code and outputting the same as the reference local signal, a first phase shifter for shifting the received signal in phase, a second phase shifter for shifting the reference local signal in phase, a first adder for adding the reference local signal and an output signal of the first shifter, a second adder for adding the received signal and an output signal of the second phase shifter, a first detector for detecting a signal level Of an output of the first adder, and a second detector for detecting a signal level of an output of the second adder.

Further, in the present invention, a first filter for performing a predetermined filtering processing with respect to an output signal of the first detector, a second filter for performing a predetermined filtering processing with respect to an output signal of the second detector, and a third filter for performing a predetermined filtering processing with respect to an output signal of the third detector.

Further, the modulator comprises a quadrature modulator.

Preferably, the spreading code included in the reference local signal is synchronized to the spreading code of the received signal.

Further, the carrier frequency of the received signal is approximately equal to the carrier frequency of the reference local signal.

Further, in the present invention, at least one of the first, second, and third detectors comprises a square-law detector.

According to a second aspect of the present invention, there is provided a spread spectrum receiver receiving a spread spectrum signal spread in bandwidth by a predetermined spreading code, comprising a local oscillator for outputting a local signal with a predetermined frequency, a local spreading code tracking means for generating a local spreading code through a process of synchronization and tracking based on the received signal and a local signal from a local oscillator, and a direct conversion circuit for generating a reference local signal based on the local signal from the local oscillator and the local spreading code from the local spreading tracking means, generating two signals having a phase difference based on the received signal and the reference local signal, and despreading based on two signals having a phase difference.

Preferably, the local spreading code tracking means comprises a local spreading code generator for generating the local spreading code based on a value of a control signal, a first phase adjusting means for delaying the generated local spreading code by a predetermined time, a second phase adjusting means for advancing the generated local spreading code by a predetermined time, a first multiplier for multiplying the local signal by an output of the first phase adjusting means, a second multiplier for multiplying the local signal by an output of the second phase adjusting means, a first adder for adding the received signal and an output of the first multiplier, a first detector for detecting an amplitude component of an output signal of the first adder, a first envelope detecting means for detecting a first envelope of an output signal of the first detector, a second adder for adding the received signal and an output of the second multiplier, a second detector for detecting an amplitude component of an output signal of the second adder, a second envelope detecting means for detecting a second envelope of an output signal of the second detector, and a control signal generating means for generating the control signal so as to reduce the difference between the first envelope and second envelope close to zero.

Further, the local spreading code tracking means comprises a local spreading code generator for generating the local spreading code based on a value of a control signal, a first phase adjusting means for delaying the generated local spreading code by a predetermined time, a second phase adjusting means for advancing the generated local spreading code by a predetermined time, a first multiplier for multiplying the local signal by an output of the first phase adjusting means, a second multiplier for multiplying the local signal by an output of the second phase adjusting means, a first phase shifter for shifting the received signal in phase, a second phase shifter for shifting an output signal of the first multiplier in phase, a third phase shifter for shifting an output signal of the second multiplier in phase, a fourth phase shifter for shifting the received signal in phase, a first adder for adding an output signal of the first phase shifter and the output of the first multiplier, a second adder for adding the received signal and an output signal of the second phase shifter, a third adder for adding the received signal and an output signal of the third phase shifter, a fourth adder for adding the output signal of the second multiplier and an output signal of the fourth phase shifter, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first norm circuit for computing a first norm based on outputs of the first and second filters, a second norm circuit for computing a second norm based on outputs of the third and fourth filters, a control signal generating means for generating the control signal so as to reduce the difference between the first norm and second norm close to zero.

Further, in the present invention, at least one of the first, second, third, and fourth detectors comprises a square-law detector.

Preferably, the spreading code tracking means further comprising a means for removing D.C. offset from outputs of the first, second, third, and fourth filter.

Further, the local spreading code tracking means comprises: a first local spreading code generator for generating an in-phase local spreading code based on a value of a control signal, a second local spreading code generator for generating a quadration local spreading code based on the value of a control signal, a first phase adjusting means for delaying the generated in-phase and quadrature local spreading codes by a predetermined time, a second phase adjusting means for advancing the generated in-phase and quadrature local spreading codes by a predetermined time, a first quadrature modulator for modulating the local signal by output signals of the first phase adjusting means, a second quadrature modulator for modulating the local signal by output signals of the second phase adjusting means, a first phase shifter for shifting the received signal in phase, a second phase shifter for shifting an output signal of the first quadrature modulator in phase, a third phase shifter for shifting an output signal of the second quadrature modulator in phase, a fourth phase shifter for shifting the received signal in phase, a first adder for adding an output signal of the first phase shifter and the output of the first quadrature modulator, a second adder for adding the received signal and an output signal of the second phase shifter, a third adder for adding the received signal and an output signal of the third phase shifter, a fourth adder for adding the output signal of the second quadrature modulator and an output signal of the fourth phase shifter, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first norm circuit for computing a first norm based on outputs of the first and second filters, a second norm circuit for computing a second norm based on outputs of the third and fourth filters, a control signal generating means for generating the control signal so as to reduce the difference between the first norm and second norm close to zero.

Further, the local spreading code tracking means comprises a first local spreading code generator for generating an in-phase local spreading code based on a value of a control signal, a second local spreading code generator for generating a quadration local spreading code based on the value of a control signal, a first phase adjusting means for delaying the generated in-phase local spreading code by a predetermined time, a second phase adjusting means for delaying the generated quadration local spreading code by a predetermined time, a third phase adjusting means for advancing the generated in-phase local spreading code by a predetermined time, a fourth phase adjusting means for advancing the generated quadration local spreading code by a predetermined time, a first multiplier for multiplying the local signal by an output signal of the first phase adjusting means, a second multiplier for multiplying the local signal by an output signal of the second phase adjusting means, a third multiplier for multiplying the local signal by an output signal of the third phase adjusting means, a fourth multiplier for multiplying the local signal by an output signal of the fourth phase adjusting means, a first adder for adding the received signal and an output signal of the first multiplier, a second adder for adding the received signal and an output signal of the second multiplier, a third adder for adding the received signal and an output signal of the third multiplier, a fourth adder for adding the received signal and an output signal of the fourth multiplier, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first norm circuit for computing a first norm based on outputs of the first and second filters, a second norm circuit for computing a second norm based on outputs of the third and fourth filters, and a control signal generating means for generating the control signal so as to reduce the difference between the first norm and second norm close to zero.

Preferably, the direct conversion circuit comprises a multiplier for multiplying the local signal by the local spreading code and outputting the same as the reference local signal, a first phase shifter for shifting the received signal in phase, a second phase shifter for shifting the reference local signal in phase, a first adder for adding the reference local signal and an output signal of the first shifter, a second adder for adding the received signal and an output signal of the second phase shifter, a first detector for detecting a signal level of an output of the first adder, and a second detector for detecting a signal level of an output of the second adder.

Further, in the present invention, the direct conversion circuit comprises a quadrature modulator for modulating the local signal by the in-phase and quadration local spreading codes and outputting the same as the reference local signal, a first phase shifter for shifting the received signal in phase, a second phase shifter for shifting the reference local signal in phase, a first adder for adding the reference local signal and an output signal of the first shifter, a second adder for adding the received signal and an output signal of the second phase shifter, a first detector for detecting a signal level of an output of the first adder, and a second detector for detecting a signal level of an output of the second adder.

According to a third aspect of the present invention, there is provided a spread spectrum receiver for a software radio receiving a spread spectrum signal spread in bandwidth by a predetermined spreading code, comprising a local oscillator for outputting a local signal with a predetermined frequency, a local spreading code tracking means for generating a local spreading code through a process including digital processing of synchronization and tracking based on the received signal and local signal from the local oscillator, and a direct conversion circuit for generating a reference local signal based on the local signal from the local oscillator and the local spreading code from the local spreading tracking means, generating two signal having a phase difference based on the received signal and the reference local signal, and despreading based on two signals having a phase difference.

Preferably, the local spreading code tracking means comprises a first local spreading code generator for generating an in-phase local spreading code based on a value of a control signal, a second local spreading code generator for generating a quadration local spreading code based on the value of a control signal, a first phase adjusting means for delaying the generated in-phase and quadration local spreading codes by a predetermined time, a second phase adjusting means for advancing the generated in-phase and quadration local spreading codes by a predetermined time, a first quadrature modulator for modulating the local signal by output signals of the first phase adjusting means, a second quadrature modulator for modulating the local signal by output signals of the second phase adjusting means, a first phase shifter for shifting the received signal in phase, a second phase shifter for shifting an output signal of the first quadrature modulator in phase, a third phase shifter for shifting an output signal of the second quadrature modulator in phase, a fourth phase shifter for shifting the received signal in phase, a first adder for adding an output signal of the first phase shifter and the output of the first quadrature modulator, a second adder for adding the received signal and an output signal of the second phase shifter, a third adder for adding the received signal and an output signal of the third phase shifter, a fourth adder for adding the output signal of the second quadrature modulator and an output signal of the fourth phase shifter, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first analog to digital (A/D) converting means for converting output analog signals of the first and second filters to digital signals, a second A/D converting means for converting output analog signals of the third and fourth filters to digital signals, and a digital processing means for generating the control signal so as to reduce the difference between the outputs of the first A/D converting means and second A/D converting means close to zero.

According to the present invention, the n-port spread spectrum direct-circuit converter, where the phase to be shifted θ is nominally equal to 45 degrees, and the detector is ideally the square function. One of the inputs is the received signal to be de-spread (demodulated). The other input is a direct sequence spread spectrum signal. The reference signal has a PN (spreading) code that has been synchronized to the PN code of the received signal. The carrier frequency of the received signal should be approximately equal to the carrier frequency of the reference signal but need not be synchronized with the carrier frequency of the local reference signal. Exact carrier and phase synchronization is performed in the digital domain. The sum of the received signal and the reference local signal phase shifted by θ are input to a power detector. The sum of the reference local signal and the received signal phase-shifted by θ is input to a second power detector. A third output produces the power of the received signal.

Further, according to the present invention, the PN code tracking circuit utilizes an early late structure along with a near-zero IF down-converter based on the direct-conversion concept, where the error signal for the tracking loop is determined from the square-law detector outputs.

Further, in a direct-conversion receiver for spread spectrum signals with complex spreading, the QPSK Mod block constitutes a complex spreader. The received signal is a signal with complex spreading.

Further, for example, there is a generalized tracking circuit for spread spectrum with direct conversion utilizing a software module in a software radio. The software module is programmed to perform the initial coarse synchronization, or PN code acquisition, through a process of stepping the frequency of the VCO through a region of values thus bringing it within the lock range for the tracking loop. The software module also contains the algorithm for the tracking loop including the generation of the error signal and the filtering of this signal.

BRIEF DESCRIPTION OF THE DRAWINGS

These and other objects and features of the present invention will become clearer from the following description of the preferred embodiments given with reference to the accompanying figures, in which.

DESCRIPTION OF THE PREFERRED EMBODIMENTS

Below, preferred embodiments will be described with reference to the accompanying drawings.

Figure 2:
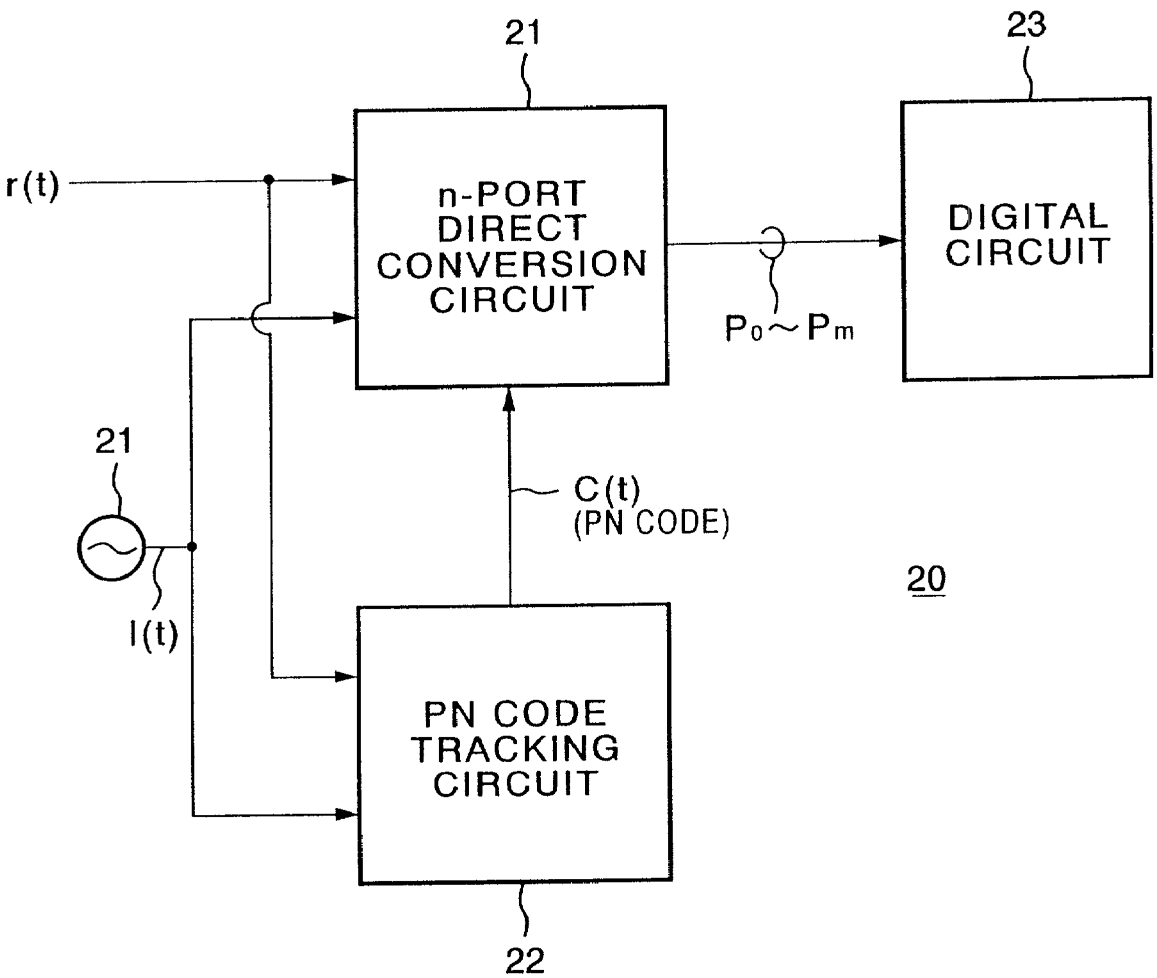
FIG. 2 is a block diagram of a first embodiment of a spread spectrum receiver according to the present; invention.

FIG. 2 is a block diagram of a first embodiment of a spread spectrum receiver according to the present invention.

The spread spectrum receiver 20 comprises, as shown in FIG. 2, an n (n is an integer 3 or more, in this embodiment, for example n=5 or 4)-port direct conversion circuit 21, a PN code tracking circuit 22, a digital circuit 23, and a local oscillator 24.

The n-port direct conversion circuit combines two signals, that is, a received signal r(t) multiplied by the PN code c(t) at the transmission side and a reference local signal l(t)×c(t) generated by multiplying a local signal l(t) from the local oscillator 24 by a local PN code (±1 value) from the PN code tracking circuit 22, in linear combinations and outputs one signal or two or more signals, wherein the analog power values of the output signal are detected by for example the FET based square-law detectors.

The PN code tracking circuit 22 generates the local PN code through a process of synchronization and tracking based on the received signal r(t) from the transmission side and the local signal 1(t) from the local oscillator 24.

The digital circuit 23 converts the output signals of the n-port direct conversion circuit 21 through the not illustrated A/D converters to one or a plurality of signal components included in the received signal or the local signal.

Next, the concrete configurations and the basic functions of the n-port direct conversion circuit 21 and the PN code tracking circuit 22 will be explained in that order.

First, the concrete configuration of the n-port direct conversion circuit 21 will be explained.

Figure 3:
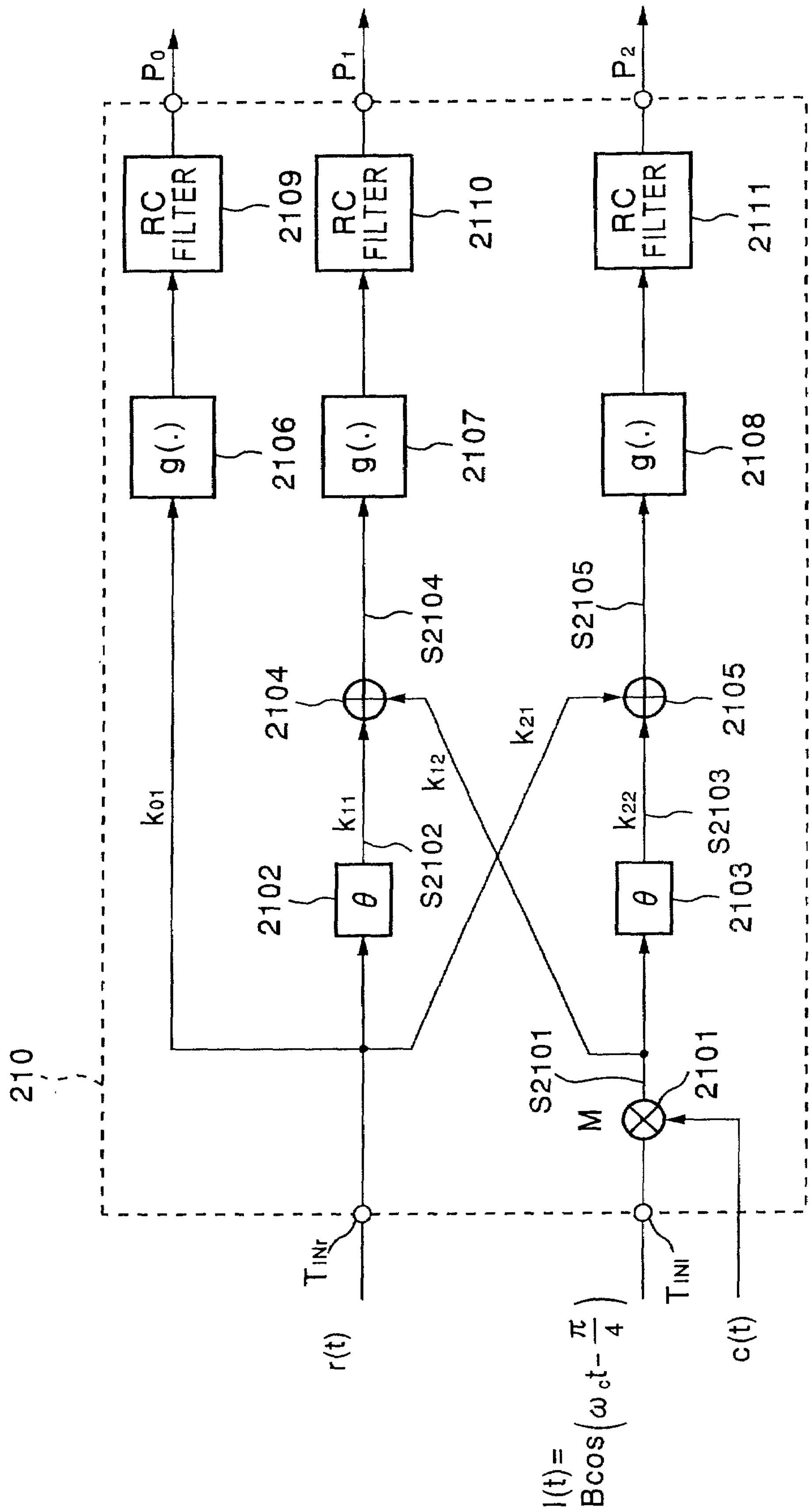
FIG. 3 is a view of an example of the configuration of a five-port direct conversion circuit according to the present invention.

FIG. 3 is a view of an example of the configuration of a five (n=5)-port direct conversion circuit according to the present invention.

The five-port direct conversion circuit 210 comprises, as shown in FIG. 3, a multiplier 2101, phase shifters 2102 and 2103, adders 2104 and 2105, detectors 2106, 2107 and 2108, and RC filters 2109, 2110, and 2111.

Here, the five ports are comprised of a receive signal use input terminal $T_{INr}$, a local signal use input terminal $T_{INl}$, an output terminal (port) of the RC filter 2109, an output port of the RC filter 2110, and an output port of the RC filter 2111.

In FIG. 3, the parameter θ indicates a phase shift (ideally 45°). The actual realization of the five-port device ensures that the two phase shifts are perfectly matched. The gain coefficients $k_{ij}$ depend on circuit component parameters, the functions g(.) of the detectors 2106 to 2108 are non-linear functions that are approximately and ideally equal to the square functions, and the RC filters 2109 to 2111 are first order low-pass filters.

In the multiplier 2101, the local signal l(t) is multiplied by the PN code c(t) obtained though a process of synchronization and tracking in the PN code tracking circuit 22 and a reference local signal S2101 is output to the phase shifter 2103 and the adder 2104. If the local signal l(t) is given by $$B\cos\left[\omega_c t - \frac{\pi}{4}\right],$$

the reference local signal is given by $$B_c(t)\cos\left[\omega_c t - \frac{\pi}{4}\right].$$

In the phase shifter 2102, the received signal r(t) is shifted in phase by θ (for example, 45°) and a signal S2102 ($r_\theta(t)$) is output to the adder 2104.

In the phase shifter 2103, the reference local signal S2102 is shifted in phase by θ and the signal S2103 is output to the adder 2105.

In the adder 2104, the output signal S2104 of the phase shifter 2102 and the reference local signal S2101 are added, and a signal S2104 is output to the detector 2107.

In the adder 2105, the output signal S2103 of the phase shifter 2103 and the received signal r(t) are added and a signal S2105 is output to the detector 2108.

In the detector 2106, the amplitude component of the received signal r(t) is detected and the detected amplitude component is supplied to the RC filter 2109.

In the detector 2107, the amplitude component of the output signal S2104 of the adder 2104 is detected and the detected amplitude component is supplied to the RC filter 2110.

In the detector 2108, the amplitude component of the output signal S2105 of the adder 2105 is detected and the detected amplitude components is supplied to the RC filter 2111.

The RC filter 2109 is comprised of, for example a low pass filter (LPF), the filtering processing is performed with respect to the amplitude component from the detector 2106, and a power signal $P_0$ is output to the digital circuit 23.

The RC filter 2110 is comprised of for example an LPF, the filtering processing is performed with respect to the amplitude component from the detector 2107, and a power signal $P_1$ is output to the digital circuit 23.

The RC filter 2111 is comprised of for example an LPF, the filtering processing is performed with respect to the amplitude component from the detector 2108, and a power signal $P_2$ is output to the digital circuit 23.

Here, the case is considered where the received signal r(t) is a double sideband signal as follows:

$$r(t)=Am(t)\cos(\omega_c t+\phi(t)) \tag{1}$$

where φ(t) is the phase that is assumed to be slowly time varying, and m(t) is the modulation signal. As mentioned above, let the local signal l(t)=

$$B\cos\left(\omega_c t - \frac{\pi}{4}\right).$$

If the local signal l(t) is perfectly tracking the received signal r(t), then we have $$\phi(t) = -\frac{\pi}{4}.$$

Now assume that g(.) is the square function. The signal $P_0$ is approximately equal to $$\frac{\kappa_{01}^2 A^2}{2} m^2(t).$$

The signal $P_1$ is given as follows:

$$\begin{aligned} &((\kappa_{11} r_\theta(t) + \kappa_{12} c(t)|(t)))^2 \\ &= Lp\left\{\kappa_{11}^2 r_\theta^2(t) + 2\kappa_{11}\kappa_{12} B r_\theta(t) c(t)\cos\left(\omega_c t - \frac{\pi}{4}\right) + \kappa_{12}^2 c^2(t)\right|^2(t)\right\} \\ &= \frac{\kappa_{11}^2 A^2}{2} m^2(t) + \frac{\kappa_{12}^2 B^2}{2} + \kappa_{11}\kappa_{12} ABm(t)c(t)\cos\left(\phi + \frac{\pi}{4} - \theta\right) \end{aligned} \tag{2}$$

where Lp indicates the low-pass component, and γθ(t) is equal to r(t) phase shifted by θ.

Now, in the above, the first term is proportional to the output $P_0$ (equality If $k_{11}=k_{01}$) the second term is a D.C. component, and the third term is the desirable signal. Hence we may process $P_1$ and $P_0$ to obtain the following:

$$Y_I = K_{11} K_{12} ABm(t)c(t)\cos\left(\phi + \frac{\pi}{4} - \theta\right) \tag{3}$$

In the same way, it is possible to show that the output at $P_2$ can be processed to obtain the following:

$$Y_Q = K_{22} K_{21} ABm(t)c(t)\cos\left(\phi + \frac{\pi}{4} + \theta\right) \tag{4}$$

Now if we set the parameter $$\theta = \frac{\pi}{4}$$

we obtain the following:

$$Y_I=km(t)c(t)\cos\phi \tag{5}$$

$$Y_Q=-km(t)c(t)\sin\phi \tag{6}$$

where k is a proportionality constant. The outputs $P_1$ and $P_2$ of the five-port direct conversion circuit 210 are processed by subtracting a multiple of $P_0$ and removing the D.C.

component to obtain the above I-Q signals. Hence the five-port direct conversion circuit 210 can be used as an I-Q direct converter.

Figure 4:
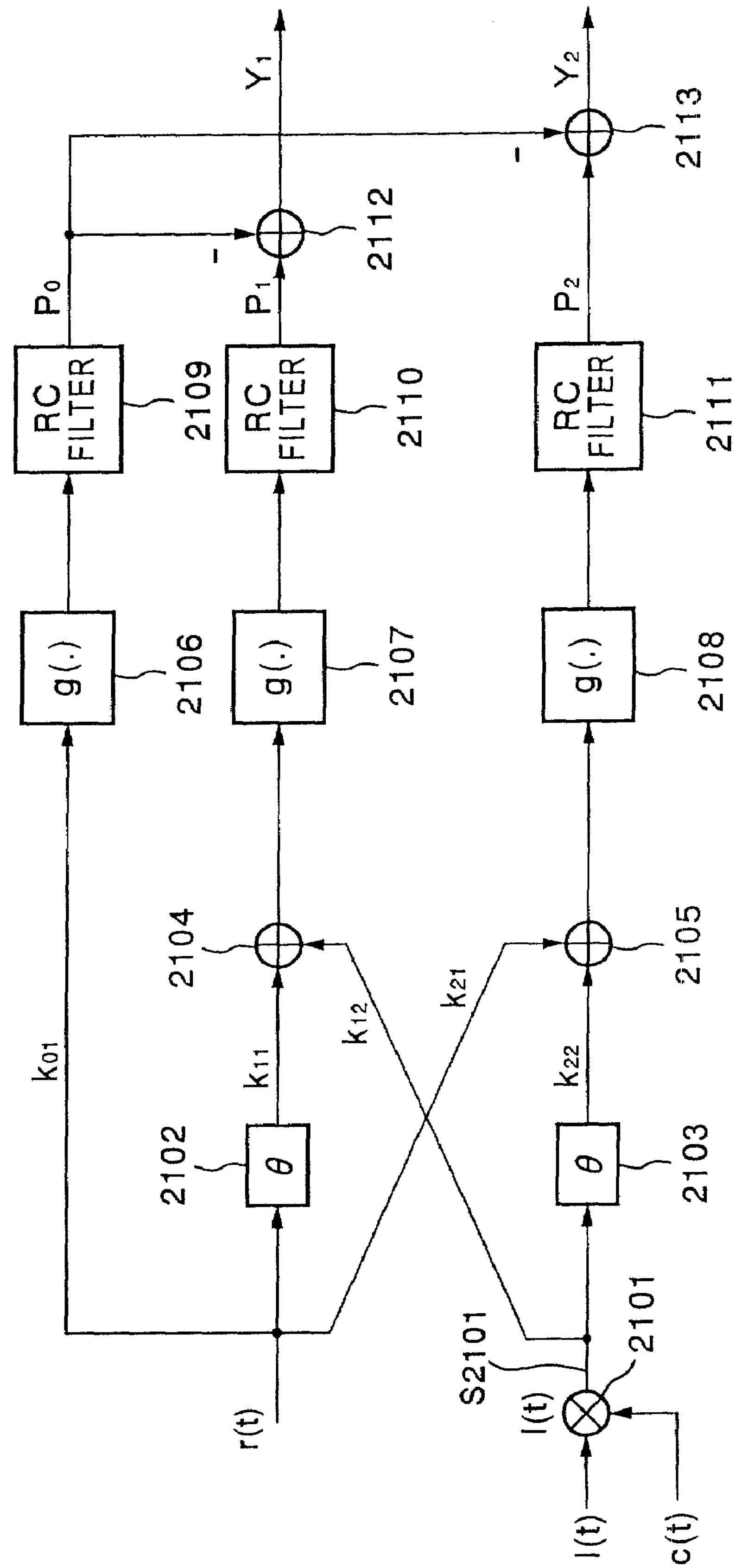
FIG. 4 is a view of an example of the configuration of a four-port direct conversion circuit according to the present invention.

Note that if the circuit components are suitably matched so that we can assume $K_{11}=K_{01}$ then the five-port direct conversion circuit can be reduced to a four-port direct conversion circuit as shown in FIG. 4, where the I-Q components can be obtained from $Y_1$ and $Y_2$ by removing a D.C. offset.

Now consider the more general case of a signal with quadrature modulation where it is possible to write the received signal r(t) as follows:

$$r(t)=A(m_i(t)\cos(\omega_c t+\phi))+m_q(t)\sin(\omega_c t+\phi)) \quad (7)$$

After processing the outputs of the five-port device by subtracting a multiple of $P_0$ and removing the D.C. component, it is possible to obtain the following I-Q signals:

$$Y_I = K\left(m_i(t)\cos\left(\phi+\frac{\pi}{4}-\theta\right)+m_q(t)\sin\left(\phi+\frac{\pi}{4}-\theta\right)\right) \quad (8)$$

$$Y_Q = K\left(m_i(t)\cos\left(\phi+\frac{\pi}{4}+\theta\right)+m_q(t)\sin\left(\phi+\frac{\pi}{4}+\theta\right)\right) \quad (9)$$

It is possible to compute the transmitted (or information) I-Q signals as follows:

$$\begin{bmatrix} m_i(t) \\ m_q(t) \end{bmatrix} = \frac{1}{\kappa\sin(2\theta)}\begin{bmatrix} \sin\left(\phi+\frac{\pi}{4}+\theta\right) & -\sin\left(\phi+\frac{\pi}{4}-\theta\right) \\ -\cos\left(\phi+\frac{\pi}{4}+\theta\right) & \cos\left(\phi+\frac{\pi}{4}-\theta\right) \end{bmatrix}\begin{bmatrix} Y_I \\ Y_Q \end{bmatrix} \quad (10)$$

Note that it is possible to solve the above for any phase angle θ except $$\theta=\frac{\pi}{2}.$$

However the value of $$\theta=\frac{\pi}{4}$$

is optimum is terms of computation robustness. If $$\theta=\frac{\pi}{4}$$

is chosen, then the above becomes the following:

$$\begin{bmatrix} m_i(t) \\ m_q(t) \end{bmatrix} = \frac{1}{K}\begin{bmatrix} \cos\phi & -\sin\phi \\ \sin\phi & \cos\phi \end{bmatrix}\begin{bmatrix} Y_I \\ Y_Q \end{bmatrix} \quad (11)$$

The original (modulation) I-Q signals are recovered by precessing the above (detected) I-Q signals with the de-rotation matrix as in equation (11). In order to perform this operation, knowledge of the carrier phase of the received signal, ϕ, is required.

Figure 5:
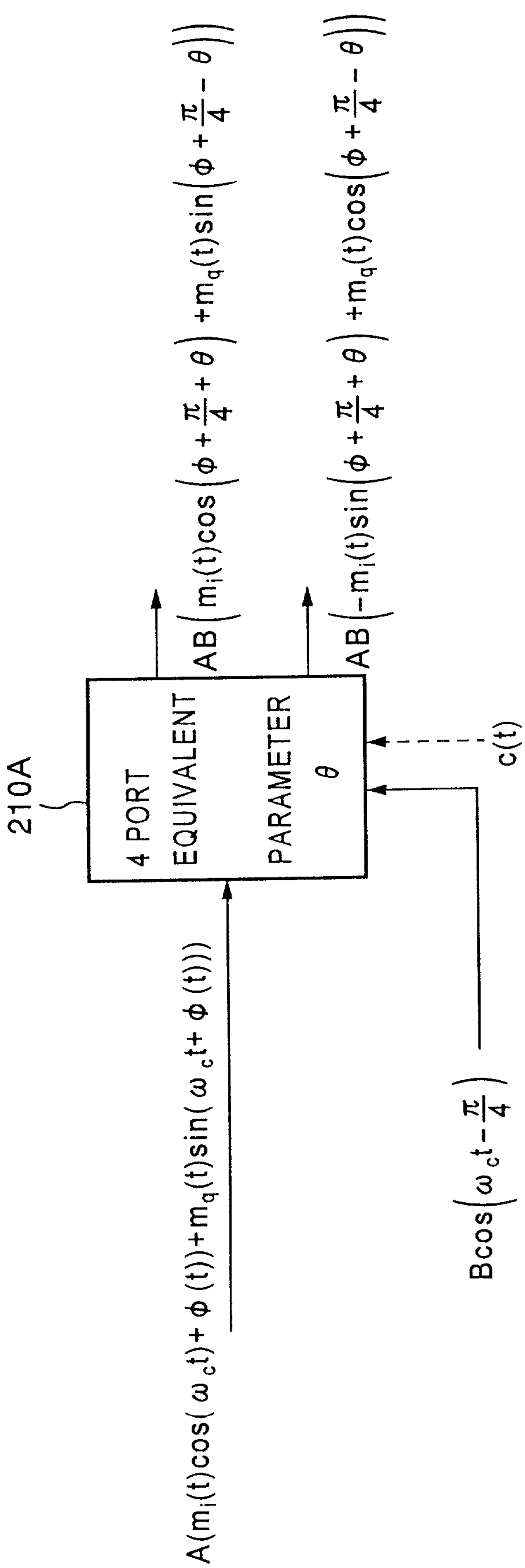
FIG. 5 is a view of an equivalent four-port direct conversion circuit at the general case of a signal with quadrature modulation.

After the above development it is possible to model the five-port device effectively as a four-port device as shown,in FIG. 5.

If the local signal of the local oscillator 24 in the preceding development, l(t), is not phase locked to the carrier of the received signal, then the above phase error Φ will be time varying and will in fact contribute to a frequency offset denoted as Δω. There are two main approaches to achieving Δω=0 and track the phase Φ. One approach is to use a phase-lock loop. The error signal is produced from the rotated I-Q outputs in such a way that it drives the VCO to track the phase of the received signal.

Figure 6:
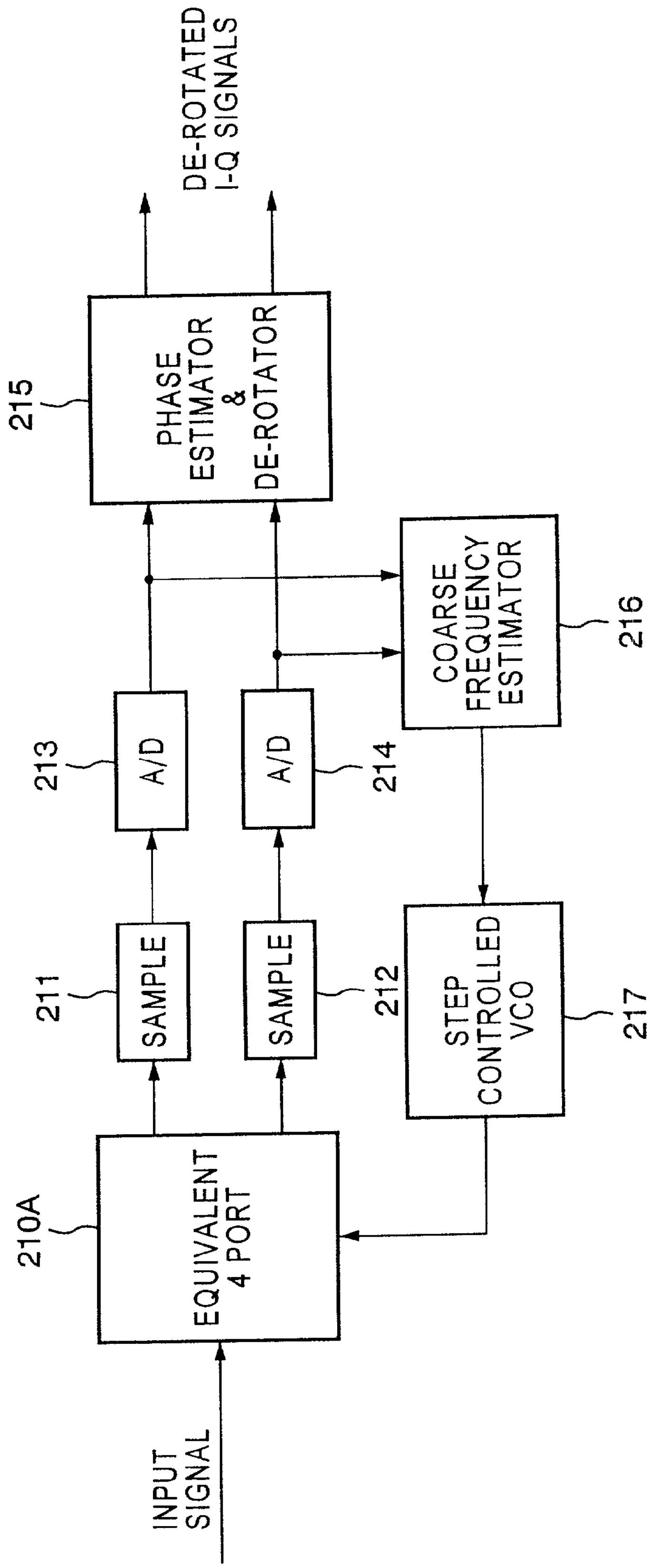
FIG. 6 is a view of a receiver based on case frequency estimation and digital please estimation.

Another alterative instead of exact tracking of the phase is to make a coarse frequency estimate of the four-port device output and use it to control the frequency of an oscillator with step input control as shown in FIG. 6.

In FIG. 6, 210A denotes the four-port direct conversion circuit, 211 and 212 denote samplers, 213 and 214 denote A/D converters, 215 denotes a phase estimator de-rotator, 216 denotes a coarse frequency estimator, and 217 denotes a voltage controlled oscillator (VCO).

The coarse frequency estimation algorithm is run periodically with a period that is determined by the degree of frequency drift of the local oscillator with respect to the carrier of the received signal r(t). The realization of the digital phase estimator 215 depends on the specifics of the modulation scheme. For QAM modulation, the phase estimator can be realized as a digital tracking loop. The two main approaches are the power of N method and the decision directed method (refer to a document [3]: H. Meyr, M. Moeneclaey, and S. Fechtel, Digital Communication Receivers: Synchronization, Channel Estimation, and Signal Processing).

Figure 1:
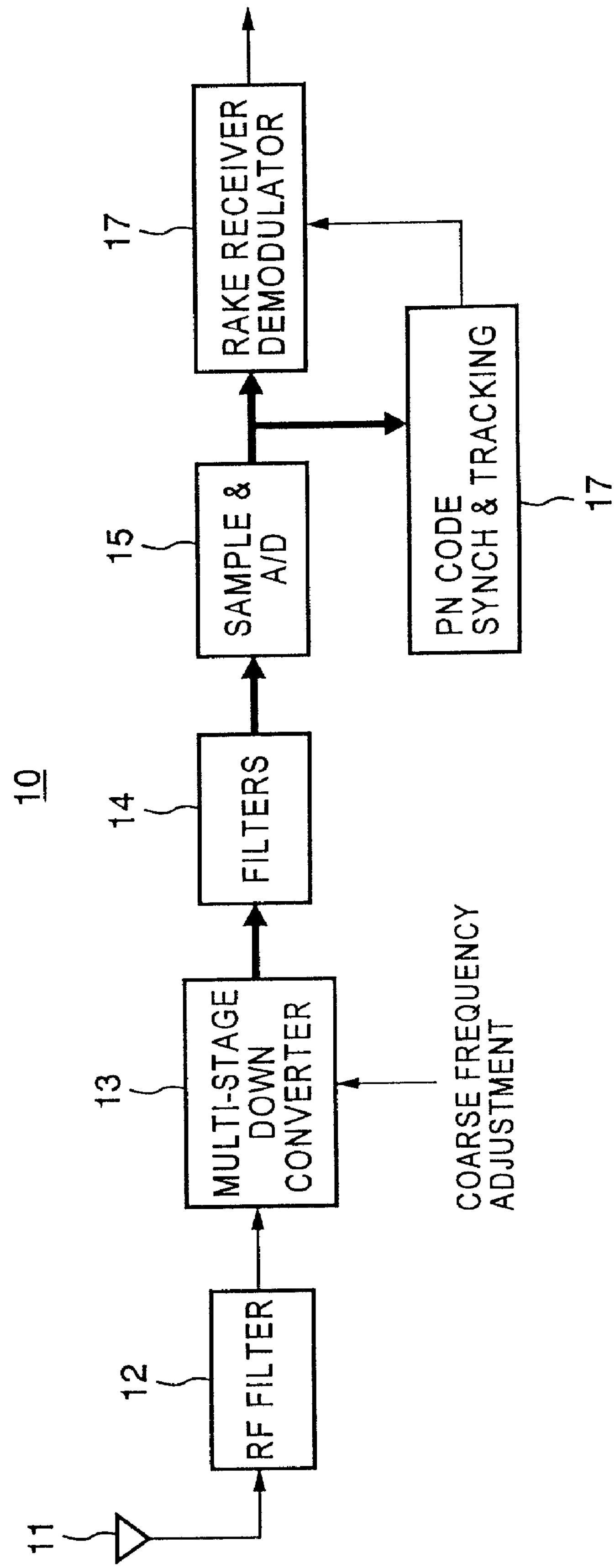
FIG. 1 is a block diagram of a conventional direct sequence spread spectrum receiver.

If a single stage of down conversion is used, the spread spectrum (SS) receiver in FIG. 1. fits into the hardware reference model of the direct converter receiver of FIG. 6. It is possible to use the direct conversion circuit to detect the PN code chips and then perform the conventional despreading using digital correlation techniques. However an alterative is to realize analog correlation using a direct-detection process.

Such a direct conversion circuit is shown in FIG. 3. As mentioned above, in FIG. 3, c(t) denotes a local replica of the PN code (±1 value). This local PN code must be obtained through a process of synchronization and tracking at the PN code tracking circuit 22.

A key issue in the design of spread spectrum receivers is the synchronization of the PN code c(t) This synchronization is difficult to achieve in the case where the spreading code is “modulated” by data.

In real systems, typically the unmodulated spreading code is transmitted as a synchronization signal. This signal may occur at the beginning of a data frame, i.e., a sync or pilot burst, or continuously as a pilot signal.

In the case of a large processing gain and high SNR, it is possible to assume data modulation on the PN code where the code acquisition occurs within the transmission of data symbols. For the purpose here, it is possible to assume the transmission of a spreading code without data modulation. A prime example is the pilot signal in the IS-95 or WCDMA systems.

Figure 7:
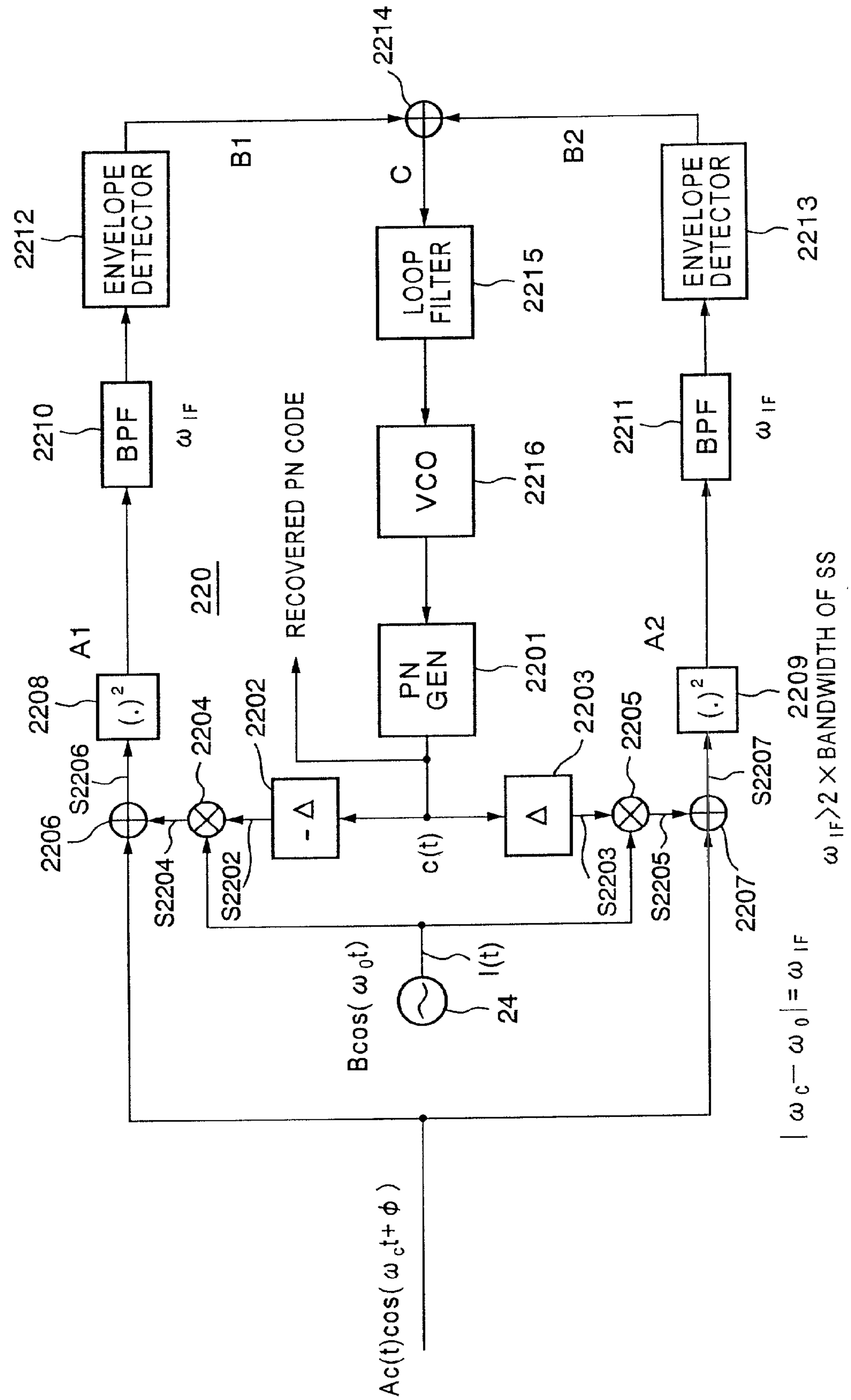
FIG. 7 is a view of an example of the configuration of a PN code tracking circuit of FIG. 2.

FIG. 7 is a view of an example of the configuration of a PN code tracking circuit of FIG. 2.

The PN code tracking circuit 220 comprises, as shown in FIG. 7, a PN code generator 2201, phase adjusting circuits 2202 and 2203, multipliers 2204 and 2205, adders 2206 and 2207, square-law detectors 2208 and 2209, band-pass filters (BPFs) 2210 and 2211, envelope detectors 2212 and 2213, a subtractor 2214, a loop filter 2215, and a VCO 2216.

For systems with a short to medium length PN code (e.g. the pilot signal in IS-95, or WCDMA), this circuit can perform the two functions of PN code acquisition and tracking.

If the initial PN code clock frequency offset is not too large then the local PN code will "slide" by the incoming PN code in the code acquisition process. This sliding process will eventually bring the two codes into alignment. At such a time the tracking circuit will then maintain the two codes synchronized.

The step control on the frequency of the VCO of the tracking loop can be designed to bring the sliding rate to within a viable value for synchronization to occur within a time period that is dependent on the PN code length and filter bandwidth (or equivalent integration time).

Concretely, in the PN code generator 2201, the PN code c(t) is generated based on a control signal S2216 by the VCO 2216, and the generated PN code c(t) is output to the phase adjusting circuits 2202 and 2203 and the multiplier 2101 of the five-port direct conversion circuit 210 in FIG. 3 (or four-port direct conversion circuit 210A in FIG. 4).

In the phase adjusting circuit 2202, the phase of the PN code c(t) generated by the PN code generator 2201 is delayed by-Δ (nominally Δ=½ chip) and a signal S2202 (C(t−Δ)) is output to the multiplier 2204.

In the phase adjusting circuit 2203, the phase of the PN code c(t) generated by the PN code generator 2201 is advanced by+Δ (as mentioned above, nominally Δ=½ chip) and a signal S2203 (c(t+Δ)) is output to the multiplier 2205.

In the multiplier 2204, the local signal l(t)[=B cos($\omega_0$t)] is multiplied by the output signal S2202 of the phase adjusting circuit 2202 and a signal S2204 ($B_c$(t−Δ) cos($\omega_0$t)) is output to the adder 2206.

In the multiplier 2205, the local signal l(t) is multiplied by the output signal S2203 of the phase adjusting circuit 2203 and a signal ($B_c$(t+Δ)cos($\omega_0$t)) is output to the adder 2207.

In the adder 2206, the received signal r(t) [Ac(t)cos($\omega_c$t+ϕ)] and the output signal S2204 of the multiplier 2204 are added and a signal S2206 (r(t)+$B_c$(t−Δ)cos($\omega_0$t)) is output to the square-law detector 2208.

In the adder 2207, the received signal r(t) and the output signal S2205 of the multiplier 2205 are added and a signal S2207 (r(t)+$B_c$(t+Δ)cos($\omega_0$t)) is output to the square-law detector 2209.

In the square-law detector 2208, a signal A1 is obtained based on the output signal S2207 of the adder 2207.

Similarly, in the square-law detector 2209, a signal A2 is obtained based on the output signal S2208 of the adder 2208.

Here, the signal at A1 is given by $$(r(t)+Bc(t-\Delta)\cos(\omega_0 t))^2=r^2(t)+2Br(t)c(t-\Delta)\cos(\omega_0 t)+B^2c^2(t-\Delta)\cos^2(\omega_0 t) \quad (12)$$

The output of the band-pass filter (BPF) 2210 is obtained as the response of the band-pass filter to the following input:

$$Bc\,(t)c(t-\Delta)\cos(\omega_{IF}t+\phi) \quad (13)$$

and is given by $$\overline{ABc(t)c(t-\Delta)}\cos((\omega_{IF}t+\phi) \quad (14)$$

where the bar indicates the filtering with a low-pass filter having a bandwidth equal to ½ of the bandwidth of the band-pass filter in FIG. 7.

The output of the envelope detector 2212 at B1 is then $|\overline{ABc(t)c(t-\Delta)}|$. Similarly the signal at the point B2 (output of the envelope detector 2213) is given by $|\overline{ABc(t)c(t+\Delta)}|$.

Figure 8:
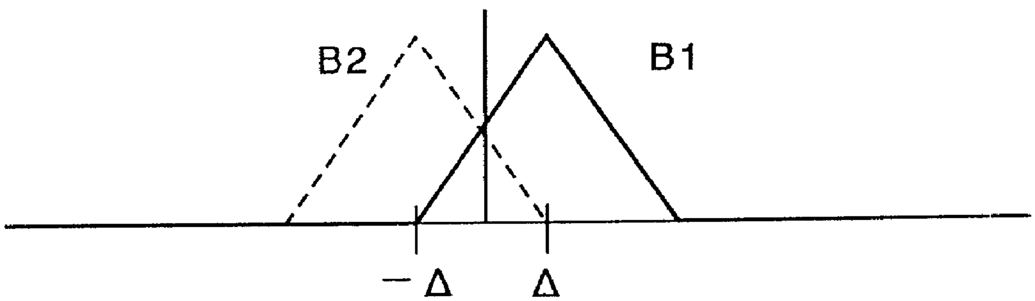
FIG. 8 is an explanatory view of the PN code correlations.

Now, if assuming rectangular chip pulses and ignoring the correlation self-noise of the PN code, then the signals at B1 and B2 have the values as shown in FIG. 8 when plotted versus the timing error between the incoming PN code and the locally generated PN code.

Figure 9:
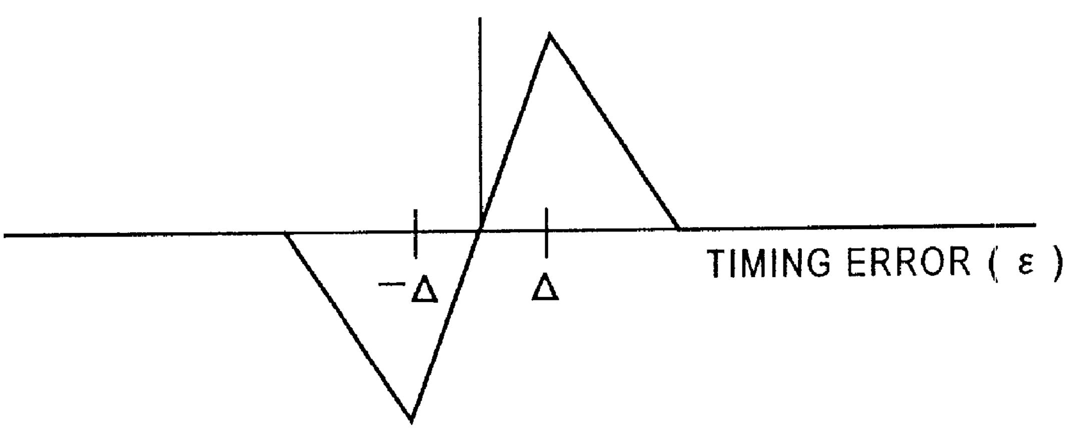
FIG. 9 is an explanatory view of the tracking “S” curve.

The signal at point C (output of the subtractor 2214), as a function of the timing error, is then the tracking "S" curve shown in FIG. 9.

The PN code tracking circuit 220 of FIG. 7 operates at the IF frequency $\omega_{IF}$. As such, it requires two band-pass filters at the outputs of the square-law detectors instead of the simpler low-pass filters.

It is possible to design a baseband version of the tracking circuit, where the local oscillator frequency is chosen to be approximately equal to the carrier frequency of the received signal r(t). To design such a tracking circuit, we consider the output of the square-law detector 2208 (2209) for the input signal $$r(t)=Ac(t)\cos(\omega_c t+\phi) \quad (15)$$

and the local reference signal $$L_1(t)=Bc(t-\tau)\cos(\omega_c t-\theta) \quad (16)$$

$$(r(t)+L_1(t))^2=r^2(t)+L_1^2(t)+ABc(t)c(t-\tau)\cos(\phi+\theta))+\text{double frequency term} \quad (17)$$

Now from this signal and possibly other square-law detector outputs, it is necessary to create a tracking curve ("S" curve) as in FIG. 9. Consider the case where the frequencies of the received signal and reference local signal are not locked. In this case, the phase Φ is actually time varying and it may be written as ϕ(t)=Δωt, where Δω is a small frequency offset.

It is clear that in order to create the "IS" curve, correlation with the "early" reference signal $L_e$(t)=Bc(t+τ)cos($\omega_c$t−θ) is not always necessary. For simplicity, it is assumed that the voltage transfer coefficients $k_{ij}$ in FIG. 3. are equal to unity. The output of one of the square-law detectors is $$(r(t)+L_e(t))^2=r^2(t)+L_e^2(t)+ABc(t)c(t+\tau)\cos(\Phi+\theta)+\text{double frequency term} \quad (18)$$

Now in the above, the required component is the third term. However, this term oscillates and for a small Δω may vanish for a time that is too long for the tracking loop. As a result, we create what are effectively quadrature components by shifting the input signal by θ and using the local reference cos ($\omega_c$t) , where $$\theta=\frac{\pi}{4}$$

is the nominal value for the phase. Now, the signals in equations (17) and (18) are filtered with a low-pass filter with a bandwidth equal to the inverse of the integration time. The following four signals are obtained:

$$\overline{r^2(t)+L_1^2(t)+ABc(t)c}(t-\tau)\cos(\phi+\theta) \quad (19)$$

$$\overline{r^2(t)+L_1^2(t)+ABc(t)c}(t-\tau)\cos(\phi-\theta) \quad (20)$$

$$\overline{r^2(t)+L_e^2(t)+ABc(t)c}(t+\tau)\cos(\phi=\theta) \quad (21)$$

$$\overline{r^2(t)+L_e^2(t)+ABc(t)c}(t+\tau)\cos(\phi-\theta) \quad (22)$$

The first term in the above four signals may be approximated by a constant assuming that the SS chip time is much smaller than the integration time, or inverse of low-pass filter (LPF) bandwidth. This constant can be treated as a D.C. offset and removed. With θ=π/4, the first two terms could be processed (square root of sum of squares) to yield a value for the early correlation. Similarly the second two terms could be processed to yield the late correlation. However a simpler approach is to use the absolute value and to form an "S" curve that in a sense is the sum of two "S" curves. If thinking of these two terms as the components of a vector, then these two approaches correspond to computing the $L_2$ and $L_1$ norms of the vector. For the case of the use of the $L_1$ norm, it is assumed that the timing error of the incoming signal is ε, then it is possible to create the "S" curve for the tracking loop as follows:

$$S(\varepsilon)=|\overline{ABc(t-\varepsilon)c(t-\tau)\cos(\phi+\theta)}|-|\overline{ABc(t-\varepsilon)c(t+\tau)\cos(\phi+\theta)}|+|\overline{ABc(t-\varepsilon)c(t-\tau)\cos(\phi-\theta)}|-|\overline{ABc(t-\varepsilon)c(t+\tau)\cos(\phi-\theta)}| \quad (23)$$

Figure 10:
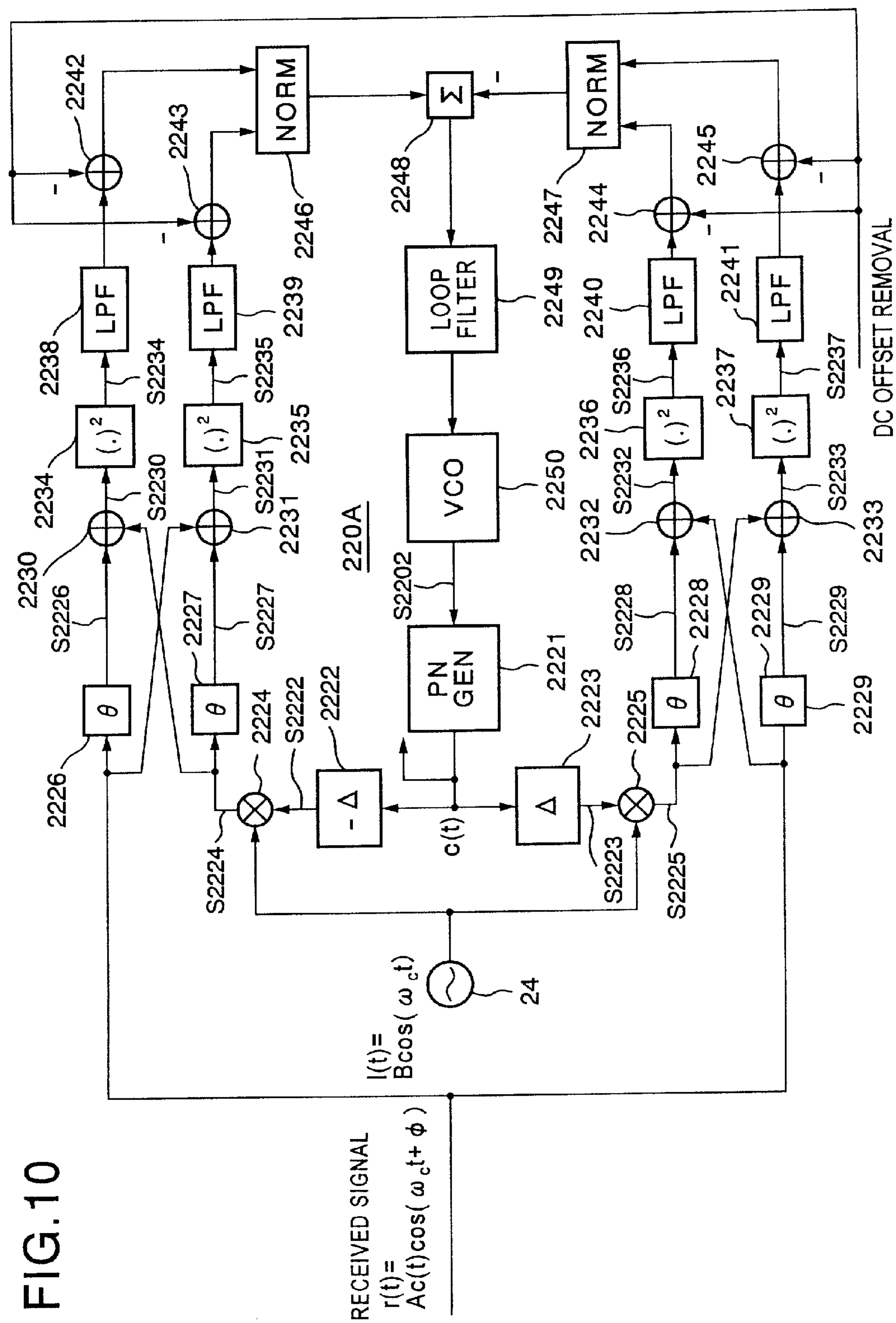
FIG. 10 is a view of another example of the configuration of a PN code tracking circuit of FIG. 2.

FIG. 10 is a view of an other example of the configuration of a PN code tracking circuit of FIG. 2 based on the above theory.

The PN code tracking circuit 220A comprises, as shown in FIG. 10, a PN code generator 2221, phase adjusting circuits 2222 and 2223, multipliers 2224 and 2225, phase shifters 2226, 2227, 2228, and 2229, adders 2230, 2231, 2232, and 2233, square-law detectors 2234, 2235, LPFs 2238, 2239, 2240, and 2241, subtractors 2242, 2243, 2244, and 2245, norm circuits 2246 and 2247, a summing circuit 2248, a loop filter 2249, and a VCO 2250.

In the PN code generator 2221, the PN code c(t) is generated based on a control signal S2250 by the VCO and the generated PN code c(t) is output to the phase adjusting circuits 2222 and 2223 and the multiplier 2101 of the five-port direct conversion circuit 210 in FIG.3 (or the four-port direct conversion circuit 210A in FIG. 4).

In the phase adjusting circuit 2222, the phase of the PN code c(t) generated by the PN code generator 2221 is delayed by −Δ

$$\left(\text{nominally } \Delta=\frac{1}{2}\text{chip}\right)$$

and a signal S2222 (c(t−Δ)) is output to the multiplier 2224.

In the phase adjusting circuit 2223, the phase of the PN code c(t) generated by the PN code generator 2221 is advanced by +Δ and a signal S2223 (c(t+Δ)) is output to the multiplier 225.

In the multiplier 2224, the local signal l(t)[=B cos($\omega_0$t)] is multiplied by the output signal S2222 of the phase adjusting circuit 2222, and a signal S2224 (Bc(t−Δ)cos($\omega_0$t)) is output to the phase shifter 2227 and the adder 2230.

While, in the multiplier 2225, the local signal l(t) is multiplied by the output signal S2223 of the phase adjusting circuit 2223, and a signal S2225 (Bc(t+Δ)cos($\omega_0$t)) is output to the phase shifter 2228 and the adder 2233.

In the phase shifter 2226, the received signal r(t) is shifted in phase by θ

$$\left(\text{for example } \frac{\pi}{4}\right),$$

and a signal S2226 is output to the adder 2230.

In the phase shifter 2227, the output signal S2224 of the multiplier 2224 is shifted in phase by θ, and the signal S2227 is output to the adder 2231.

In the adder 2230, the output signal S2226 of the phase shifter 2226 and the output signal S2224 of the multiplier 2224 are added, and a signal S2230 is output to the square-law detector 2234.

In the adder 2231, the received signal r(t) and the output signal S2227 of the phase shifter 2227 are added, and a signal S2231 is output to the square-law detector 2235.

In the square-law detector 2234, the output signal S2230 of the adder 2230 is squared and output to the LPF 2238, and then input to the subtractor 2242. In the subtractor 2242, the D.C. offset etc. is removed from the output of LPF 2238 and the result output to the norm circuit 2246.

Similarly, in the square-law detector 2235, the output signal S2231 of the adder 2231 is squared and output to the LPF 2239, and then input to the subtractor 2243. In the subtractor 2243, the D.C. offset is removed from the output of the LPF 2239 and the result output to the norm circuit 2246.

In the norm circuit 2246, the norms of the vector are computed and output to the summing circuit 2248.

In the phase shifter 2228, the output signal S2225 of the multiplier 2225 is shifted in phase by θ, and the signal S2228 is output to the adder 2232.

In the phase shifter 2229, the received signal r(t) is shifted by θ

$$\left(\text{for example } \frac{\pi}{4}\right),$$

and a signal S2229 is output to the adder 2233.

In the adder 2232, the received signal r(t) and the output signal S2228 of the phase shifter 2228 are added, and a signal S2232 is output to the square-law detector 2236.

In the adder 2233, the output signal S2229 of the phase shifter 2229 and the output signal S2225 of the multiplier 2225 are added, and a signal S2233 is output to the square-law detector 2237.

In the square-law detector 2236, the output signal S2232 of the adder 2232 is squared and output to the LPF 2240, and then input to the subtractor 2244. In the subtractor 2244, the D.C. offset etc. is removed. from the output of LPF 2240 and output to the norm circuit 2247.

Similarly, in the square-law detector 2237, the output signal S2233 of the adder 2233 is squared and output to the LPF 2241, and then input to the subtractor 2245. In the subtractor 2245, the D.C. offset is removed from the output of the LPF 2241 and output to the norm circuit 2247.

In the norm circuit 2247, the norms of the vector are computed and output to the summing circuit 2248.

In the summing circuit 2248, the output of the norm circuit 2246 and 2247 are summed and output to the VCO 2250 via the loop filter 2249.

In the VCO 2250, the oscillation frequency is changed by the output of the loop filter 2249, and the value of the control signal S2250 is changed according to the change of the oscillation frequency.

In this PN code tracking circuit 220A, the bandwidth of the LPF depends on the SNR. If the incoming signal has no modulation, e.g., is the pilot signal in IS-95 or WCDMA, the bandwidth is equal to approximately the inverse of the integration time for the PN code correlation. This bandwidth is chosen depending on the SNR and false-lock probability requirements.

On the other hand, if the incoming signal is modulated by data, then the bandwidth of the LPF should not be smaller than the data rate, i.e., the (equivalent) integration time should be less than the data period.

In comparing the IF and baseband tracking circuits of FIG. 7 and FIG. 10, it should be noted that a direct conversion receiver typically does not require an image rejection filter. An RF front-end filter may still be desirable since it will limit the strength of the interference in the power detection circuits, which may drive these circuits into the non-linear region. However, the design of this filter in terms of the roll-off from the pass-band to the stop-band is not critical.

On the other hand, with an IF based receiver, the RF front-end filter has the function of removing the image frequency. For narrow-band systems, it is critical that the image frequency be removed, and the complexity of the filter depends on the IF frequency used. For small IF frequency is closer to the local oscillator frequency and the filter specification (roll-off) is more stringent.

On the other hand, with spread spectrum signals, as a result of the processing gain, it is not essential that an RF filter with image rejection capability be used. The signal of the image frequency will act as an interfere, and the effect on the receiver will be about a 3 dB loss in SNR.

Figure 11:
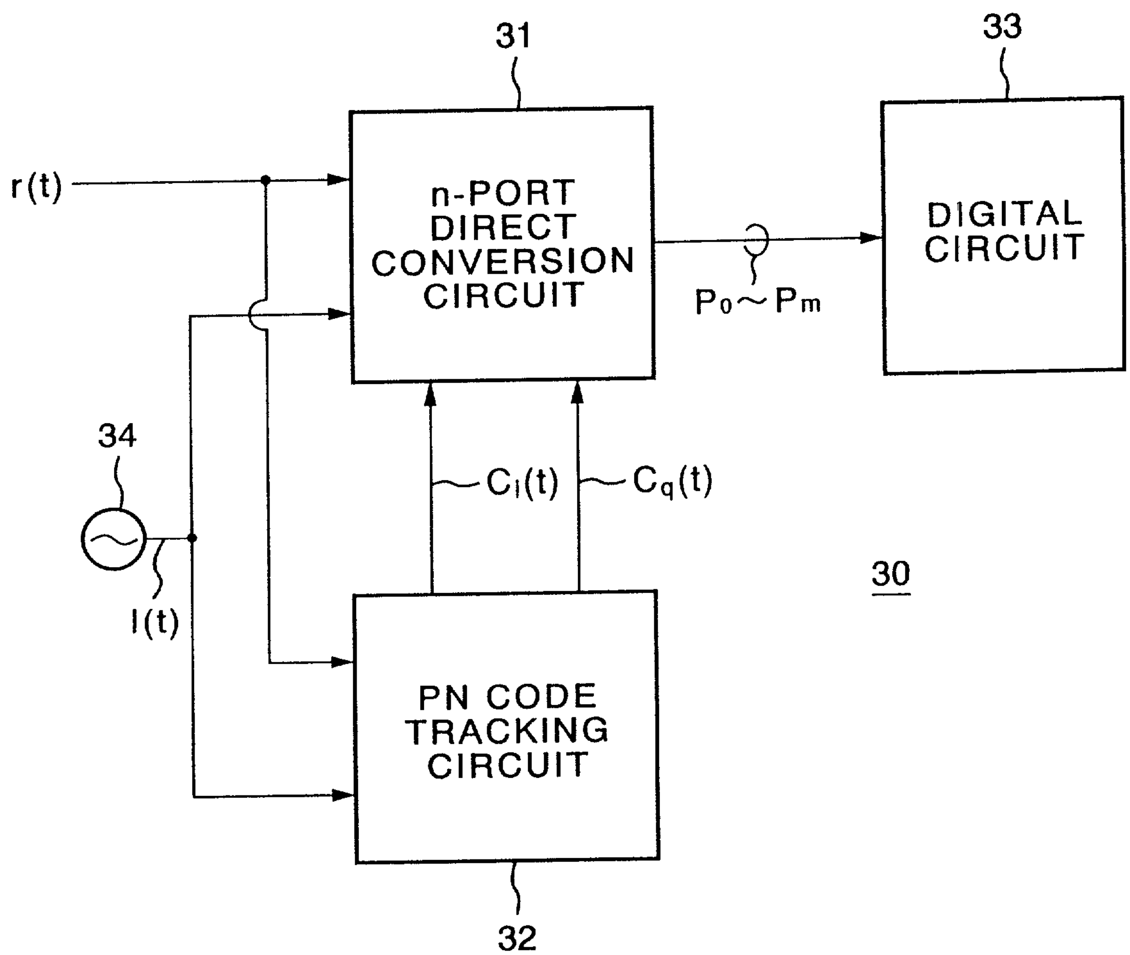
FIG. 11 is a block diagram of a second embodiment of a spread spectrum receiver according to the present invention.

FIG. 11 is a block diagram of a second embodiment of a spread spectrum receiver according to the present invention.

The spread spectrum receiver 30 is constituted corresponding to the quadrature spreading and despreading processing.

The spread spectrum receiver 30 comprises, as shown in FIG. 11, an n (n is an integer 3 or more, in this embodiment, for example or=5 or 4)-port direct conversion circuit 31, a PN code tracking circuit 32, a digital circuit 33, and a local oscillator 34.

The n-port direct conversion circuit 31 combines two signals, which are a receiver signal r(t) multiplied by the PN code c(t) at the transmission side and a local reference signal l(t)c*(t) (where c(t) a complex spreading code as explained below) generated by modulating a local signal l(t) from the local oscillator 34 with local PN codes ($c_i(t)$ and $C_q(t)$) from the PN code tracking circuit 32, in linear combinations and output one signal or two or more signals, wherein the analog power values of the output signal are detected by for example the FET based square-law detectors.

The PN code tracking circuit 32 generates the local PN codes $c_i(t)$ and $C_q(t)$ through a process of synchronization and tracking based on the received signal r(t) from the transmission side and the local signal l(t) from the local oscillator 34.

The digital circuit 33 converts the output signals of the n-port direct conversion circuit 31 through the not illustrated A/D converters to one or a plurality of signal components included in the received signal or the local signal.

There are three main direct sequence schemes that utilize some form of QPSK modulation at the chip level. Here QPSK1, QPSK2, and QPSK3 will be referenced to. In QPSK1, we form a regular QPSK signal by using the data symbols and spread each of the data symbols (on the in-phase and quadrature carriers) with two different PN codes.

In QPSK2, it is possible to take individual data symbols and spread them with two different PN codes, with one spread signal being transmitted in the in-phase carrier and the other being transmitted on the quadrature carrier. This form of the spread spectrum is used in the forward link of IS-95.

QPSK3 is what is typically referred to as complex spreading and is used in 3G WCDMA systems.

First we will consider the use of the five-port device for direct detection of these signals assuming that a synchronized local PN code exists at the receiver, then will discuss circuits for the PN code synchronization.

For the case of QPSK1, first, we will consider the case where local synchronized PN code and carrier signals exist. In this case, since the received signal effectively consists of two independent SS signals in the in-phase and quadrature carrier components, it is possible to utilize two five-port based circuits, as explained above for the BPSK case, to independently demodulate the in-phase and quadrature signals. If the perfect carrier synchronization is realized, there will be no interference between the two branches (in-phase and quadrature).

Next, it will be considered the case where there is a synchronized PN code but no synchronized carrier at the receiver. In this case, it is possible to use two independent BPSK type circuits to demodulate the in-phase and quadrature data, but there will be some interference between the two branches due to the non-zero cross-correlation of the spreading codes in the two QPSK branches. The degree of this interference will depend on the integration time, filter bandwidth, or equivalent processing gain and should be small for modest to large values of these parameters.

Next, the concrete configurations and the basic functions of the n-port direct conversion circuit 31 and the PN code tracking circuit 32 will be described.

First, the concrete configuration of the n-port direct conversion circuit 31 will be explained.

Figure 12:
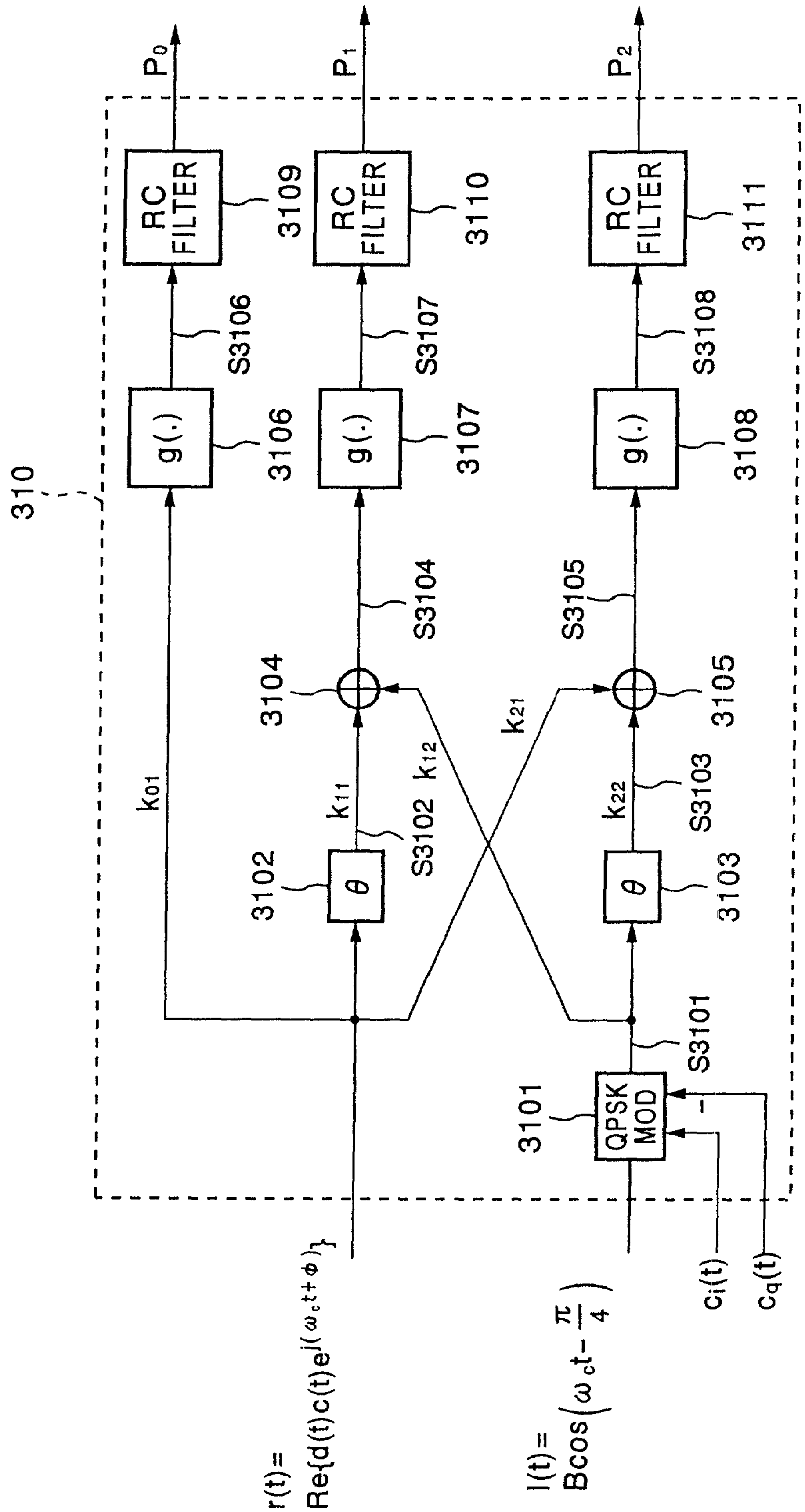
FIG. 12 is a view of an example of the configuration of a five-port direct conversion circuit for DS/BPSK according to the present invention.

FIG. 12 is a view of an example of the configuration of a five (n=5)-port direct conversion circuit according to the present invention.

The five-port direct conversion circuit 310 comprises, as shown in FIG. 12, a QPSK modulator 3101, phase shifters 3102 and 3103, adders 3104 and 3105, detectors 3106, 3107, and 3108, and RC filters 3109, 3110, and 3111.

Here, the five ports are comprised of a received signal use input terminal $T_{INR}$, a local signal use input terminal $T_{INl}$, an output terminal (port) of the RC filter 3109, an output port of the RC filter 3110, and an output port of the RC filter 3111.

In the QPSK modulator 3101, the received signal r(t) is modulated by using the PN code $c_i(t)$ and $c_q(t)$ obtained though a process of synchronization and tracking in the PN code tracking circuit 32, and a reference local signal S3101 is output to the phase shifter 3103 and the adder 3104.

In the phase shifter 3102, the received signal r(t) is shifted in phase by θ (for example, 45°) and a signal S3102 is output to the adder 3104.

In the phase shifter 3103, the reference local signal S3101 is shifted in phase by θ and the signal S3103 is output to the adder 3105.

In the adder 3104, the output signal S3102 of the phase shifter 3102 and the reference local signal S3101 are added, and a signal S3104 is output to the detector 3107

In the adder 3105, the output signal S3103 and the received signal r(t) are added, and a signal S3105 is output to the detector 3108.

In the detector 3106, the amplitude component of the received signal r(t) is detected, and the detected amplitude component is supplied to the RC filter 3109.

In the detector 3107, the amplitude component of the output signal S3104 of the adder 3104 is detected, and the detected amplitude component is supplied to the RC filter 3110.

In the detector 3108, the amplitude component of the output signal S3105 of the adder 3105 is detected, and the detected amplitude component is supplied to the RC filter 3111.

The RC filter 3109 is comprised of, for example, a low-pass filter (LPF), the filtering processing is performed with respect to the amplitude component from the detector 3106, and a power signal $P_0$ is output to the digital circuit 33.

The RC filter 3110 is comprised of for example an LPF, the filtering processing is performed with respect to the amplitude component from the detector 3107, and a power signal $P_1$ is output to the digital circuit 33.

The RC filter 3111 is comprised of for example an LPF, the filtering processing is performed with respect to the amplitude component from the detector 3108, and a power signal $P_2$ is output to the digital circuit 33.

Here, QPSK2 and QPSK3 will be considered at the direct conversion circuit 310 of FIG. 12. It is possible to treat these two cases together as follows: The following received SS signal will be considered.

$$r(t)=Re\{d(t)c(t)e^{j(\omega_c t+\phi)}\} \tag{24}$$

where $c(t)=c_i(t)+jc_q(t)$ is a complex spreading code (two real spreading codes), and d(t) is a data signal. If d(t) is real, then it is QPSK2, and if d(t) is complex, then it is QPSK3, as discussed above.

Here, a direct conversion circuit 310 to detect the signal in equation (24) will be considered. For example, based on the sum of the local signal $$l_i(t)=\mathrm{Re}\left\{c^*(t)e^{-j\left(\omega_c t-\frac{\pi}{4}+\theta\right)}\right\}$$

and the received signal input to a square-law detector, the following equation (25) can be obtained.

$$\begin{aligned}\left(\mathrm{Re}\{d(t)c(t)e^{j(\varpi_c t+\phi)}\}+\mathrm{Re}\left\{c^*(t)e^{-j\left(\omega_c t-\frac{\pi}{4}+\theta\right)}\right\}\right)^2 &= \\ \frac{1}{4}\times\left(d(t)c(t)e^{j(\varpi_c t+\phi)}+d^*(t)c^*(t)e^{-j(\varpi_c t+\phi)}+c^*(t)e^{-j\left(\omega_c t-\frac{\pi}{4}+\theta\right)}+c(t)e^{j\left(\omega_c t-\frac{\pi}{4}+\theta\right)}\right)^2 &= \\ r^2(t)+l_i^2(t)+|c(t)|^2\,d(t)e^{j\left(\phi+\frac{\pi}{4}-\theta\right)}+|c(t)|^2\,d^*(t)e^{-j\left(\phi+\frac{\pi}{4}-\theta\right)}+\text{double freq. terms}\end{aligned} \tag{25}$$

Subtracting the squares of the received and local signals and the double frequency terms and assuming $|c(t)|^2=2$ (i.e., square shaped local chip pulses), the following equation can be obtained:

$$I=\frac{1}{2}\left(d(t)e^{j\left(\phi+\frac{\pi}{4}-\theta\right)}+d^*(t)e^{-j\left(\phi+\frac{\pi}{4}-\theta\right)}\right) \tag{26}$$

Now the following same procedure as above but with the local signal is followed $$lr(t)=\mathrm{Re}\left\{c^*(t)e^{-j\left(\omega_c t-\frac{\pi}{4}-\theta\right)}\right\} \tag{27}$$

to obtain the result $$Q=\frac{1}{2}\left(d(t)e^{j\left(\phi+\frac{\pi}{4}+\theta\right)}+d^*(t)e^{-j\left(\phi+\frac{\pi}{4}+\theta\right)}\right) \tag{28}$$

Now, for $$\theta=\frac{\pi}{4},$$

the following two outputs can be obtained.

$$I(t)=\frac{1}{2}(d(t)e^{j\phi}+d^*(t)e^{-j\phi})=\mathrm{Re}(d(t)e^{j\phi}) \tag{29}$$

$$Q(t)=\frac{j}{2}(d(t)e^{j\phi}-d^*(t)e^{-j\phi})=-\mathrm{Im}(d(t)e^{j\phi}) \tag{30}$$

Therefore the data signal may be determined as follows:

$$d(t)=(I(t)-jQ(t))e^{-j\phi} \tag{31}$$

The above processing is performed in the five-port direct conversion circuit 310 of FIG. 12.

Next, the PN code synchronization circuits of FIG. 11 for the various QPSK schemes will be explained. The approach is to achieve PN code synchronization using a direct detection type circuit and to leave the carrier frequency and phase synchronization to the digital domain in the baseband processing. The case of a received signal without data modulation will be assumed. Thus, for all the QPSK type schemes, the synchronization problem amounts to locking onto a signal of the following form:

$$r(t)=A(c_I(t)\cos(\omega_c t+\phi)+c_Q(t)\sin(\omega_c t+\phi)) \tag{32}$$

where $c_I$, (t) and $c_Q$ (t) are two spreading codes—the so-called quadrature spreaders in the case of QPSK2 (IS-95).

To achieve spreading code synchronization in this case, it is sufficient to synchronize to either of the two PN codes since they are locked to each other at the transmitter. Hence in principle it is possible to use a circuit of the type of FIG. 7 or FIG. 10 with c(t) set to either of the two quadrature spreaders.

Figure 13:
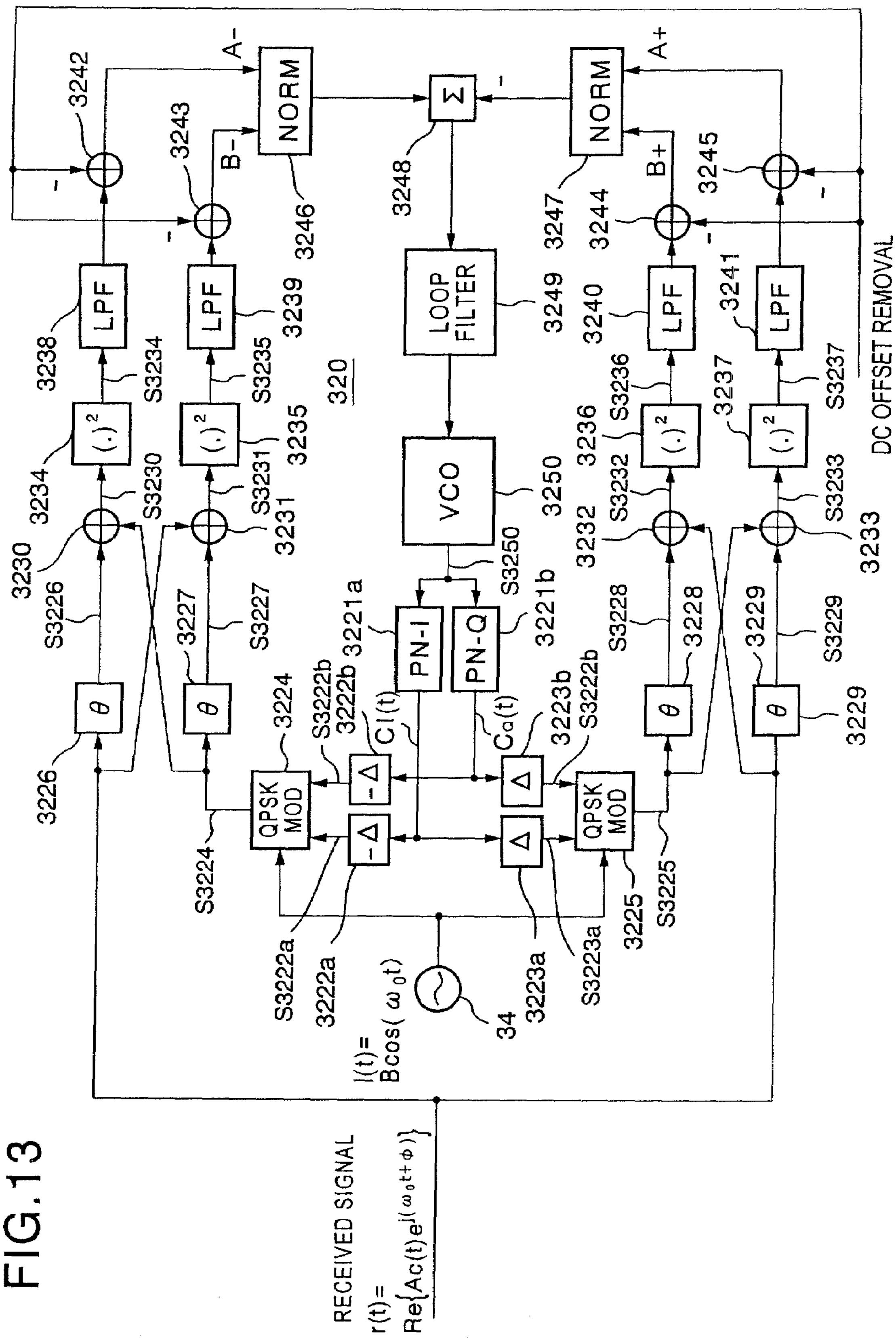
FIG. 13 is a view of an example of the configuration of a PN code tracking circuit of FIG. 11 that effectively correlates with a local QPSK type of signal.

Alternatively, to achieve a higher SNR in the tracking loop, a circuit that effectively correlates with a local QPSK type of signal can be realized as shown in FIG. 13.

FIG. 13 is a view of an example of the configuration of a PN code tracking circuit of FIG. 11 based on that effectively converted with a local QPSK type of signal.

The PN code tracking circuit 320 comprises, as shown in FIG. 13, PN code generators 3221*a* and 3221*b*, phase adjusting circuits 3222*a*, 3222*b*, 3223*a* and 3223*b*, QPSK modulators 3224 and 3225, phase shifters 3226, 3227, 3228, and 3229, adders 3230, 3231, 3232, and 3233, square-law detectors 3234, 3235, 3236, and 3237, LPFs 3238, 3239, 3240, and 3241, subtractors 3242, 3243, 3244, and 3245, norm circuits 3246 and 3247, a summing circuit 3248, a loop filter 3249, and a VCO 3250.

In the PN code generator 3221*a*, the PN code $c_I(t)$ is generated based on a control signal S2250 by the VCO 3250, and the generated PN code $c_I(t)$ is output to the phase adjusting circuits 3222*a* and 3223*a* and the QPSK modulator 3101 of the five-port direct conversion circuit 310 in FIG. 12.

In the PN code generator 3221*b*, the PN code $c_Q(t)$ is generated based on a control signal S2250 by the VCO 3250, and the generated PN code $c_Q(t)$ is output to the phase adjusting circuits 3222*b* and 3223*b* and the QPSK modulator 3101 of the five-port direct conversion circuit 310 in FIG. 12.

In the phase adjusting circuit 3222*a*, the phase of the PN code $c_I(t)$ generated by the PN code generator 3221*a* is delayed by $-\Delta$ $$\left(\text{nominally } \Delta = \frac{1}{2}\text{chip}\right),$$

and a signal S3222*a* ($c_I(t-\Delta)$) is output to the QPSK modulator 3224.

In the phase adjusting circuit 3222*b*, the phase of the PN code $C_Q(t)$ generated by the PN code generator 3221*b* is delayed by $-\Delta$ $$\left(\text{nominally } \Delta = \frac{1}{2}\text{chip}\right),$$

and a signal S3222*b* ($c_Q(t-\Delta)$) is output to the QPSK modulator 3224.

In the phase adjusting circuit 3223*a*, the phase of the PN code $c_I(t)$ generated by the PN code generator 3221*a* is advanced by $+\Delta$, and a signal S3223 ($c_I(t+\Delta)$) is output to the QPSK modulator 3225.

In the phase adjusting circuit 3223*b*, the phase of the PN code $C_Q(t)$ generated by the PN code generator 3221*b* is advanced by $+\Delta$, and a signal S3223*b* ($c_I(t+\Delta)$) is output to the QPSK modulator 3225.

In the QPSK modulator 3224, the local signal $l(t)[=B \cos(\omega)_0 t)]$ is modulated by the output signals S3222*a* and S3222*b* of the phase adjusting circuits 3222*a* and 3222*b*, and a signal S3224 is output to the phase shifter 3227 and the adder 3230.

While, in the QPSK modulator 3225, the local signal l(t) is modulated by the output signals S3223*a* and 3223*b* of the phase adjusting circuits 3223*a* and 3223*b*, and a signal S3225 is output to the phase shifter 3228 and the adder 3233.

In the phase shifter 3226, the received signal r(t) is shifted in phase by $\theta$ $$\left(\text{for example } \frac{\pi}{4}\right),$$

and a signal S3226 is output to the adder 3230.

In the phase shifter 3227, the output signal S3224 of the QPSK modulator 3224 is shifted in phase by $\theta$, and the signal S3227 is output to the adder 3231.

In the adder 3230, the output signal S3226 of the phase shifter 3226 and the output signal S3224 of the QPSK modulator 3224 are added, and a signal S3230 is output to the square-law detector 3234.

In the adder 3231, the received signal r(t) and the output signal S3227 of the phase shifter 3227 are added, and a signal S3231 is output to the square-law detector 3235.

In the square-law detector 3234, the output signal S3230 of the adder 3230 is squared and output to the LPF 3238, and then input to the subtractor 3242. In the subtractor 3242, the D.C. offset etc. is removed from the output of LPF 3238 and output to the norm circuit 2246.

Similarly, in the square-law detector 3235, the output signal S3231 of the adder 3231 is squared and output to the LPF 3239, and then input to the subtractor 3243. In the subtractor 3243, the D.C. offset is removed from the output of the LPF 3239 and output to the norm circuit 3246.

In the norm circuit 3246, the norms of the vector are computed and output to the summing circuit 3248.

In the phase shifter 3228, the output signal S3225 of the QPSK modulator 3225 is shifted in phase by $\theta$, and the signal S3228 is output to the adder 3232.

In the phase shifter 3229, the received signal r(t) is shifted in phase by $\theta$ $$\left(\text{for example } \frac{\pi}{4}\right),$$

and a signal S3229 is output to the adder 3233.

In the adder 3232, the received signal r(t) and the output signal S3228 of the phase shifter 3228 are added, and a signal S3232 is output to the square-law detector 3236.

In the adder 3233, the output signal S3229 of the phase shifter 3229 and the output signal S3225 of the QPSK modulator 3225 are added, and a signal S3233 is output to the square-law detector 3237.

In the square-law detector 3236, the output signal S3232 of the adder 3232 is squared and output to the LPF 2240, and then input to the subtractor 3244. In the subtractor 3244, the D.C. offset etc. is removed from the output of LPF 3240 and output to the norm circuit 3247.

Similarly, in the square-law detector 3237, the output signal S3233 of the adder 3233 is squared and output to the LPF 3241, and then input to the subtractor 3245. In the subtractor 3245, the D.C. offset is removed from the output of the LPF 3241 and output to the norm circuit 3247.

In the norm circuit 3247, the norms of the vector are computed and output to the summing circuit 3248.

In the summing circuit 3248, the output of the norm circuit 3246 and 3247 are summed and output to the VCO 3250 via the loop filter 3249.

In the VCO 3250, the oscillation frequency is changed by the output of the loop filter 3249, and the value of the control signal S3250 is changed according to the change of the oscillation frequency.

According to the configuration of FIG. 13, the signal at A– (output of the subtractor 3242) is given as follows:

$$\left(\frac{B}{2}(c(t-\Delta)e^{j(\omega_o t-\theta)}+c^*(t-\Delta)e^{-j(\varpi_o t-\theta)}+)+\frac{A}{2}(c(t)e^{j(\omega_o t+\phi)}+c^*(t)e^{-j(\omega_o t+\phi)})\right)^2=+$$
$$(BRe\{c(t-\Delta)e^{j(\omega_o t-\theta)}\})^2+(ARe\{c(t)e^{j(\omega_o t+\phi)}\})^2+$$
$$ABRe\{c(t-\Delta)c(t)e^{j(2\omega_o t+\phi-\theta)}\}+ABRe\{c^*(t-\Delta)c(t)e^{j(\phi+\theta)}\}$$

Now, the first three terms in the above are either D.C. or double frequency terms. Hence if the signal passes the low-pass filter and the D.C. offset is removed, the following signal at A– can be obtained:

$$AB\mathrm{Re}\{\overline{c^*(t-\Delta)c(t)}e^{j(\phi+\theta)}\} \tag{33}$$

where the bar indicates low pass filtering. In the same manner, the following signals for B–, A+, and B+ can be obtained respectively as $$AB\mathrm{Re}\{\overline{c^*(t-\Delta)c(t)}e^{j(\phi-\theta)}\} \tag{34}$$

$$AB\mathrm{Re}\{\overline{c^*(t+\Delta)c(t)}e^{j(\phi+\theta)}\} \tag{35}$$

$$AB\mathrm{Re}\{\overline{c^*(t+\Delta)c(t)}e^{j(\phi-\theta)}\} \tag{36}$$

Now if treating the two values in equations (33) and (34) as two components of a vector and taking the $L_2$ norm, then any phase dependency in computing the error signal for the tracking loop can be removed. Alternatively, one may go for a simpler realization and work with the $L_1$ norm, where the computation of the norm amounts to the sum of the absolute values of two complex numbers.

Next, a sub-optimal tracking circuit that does not require carrier phase shifters will be considered.

Figure 14:
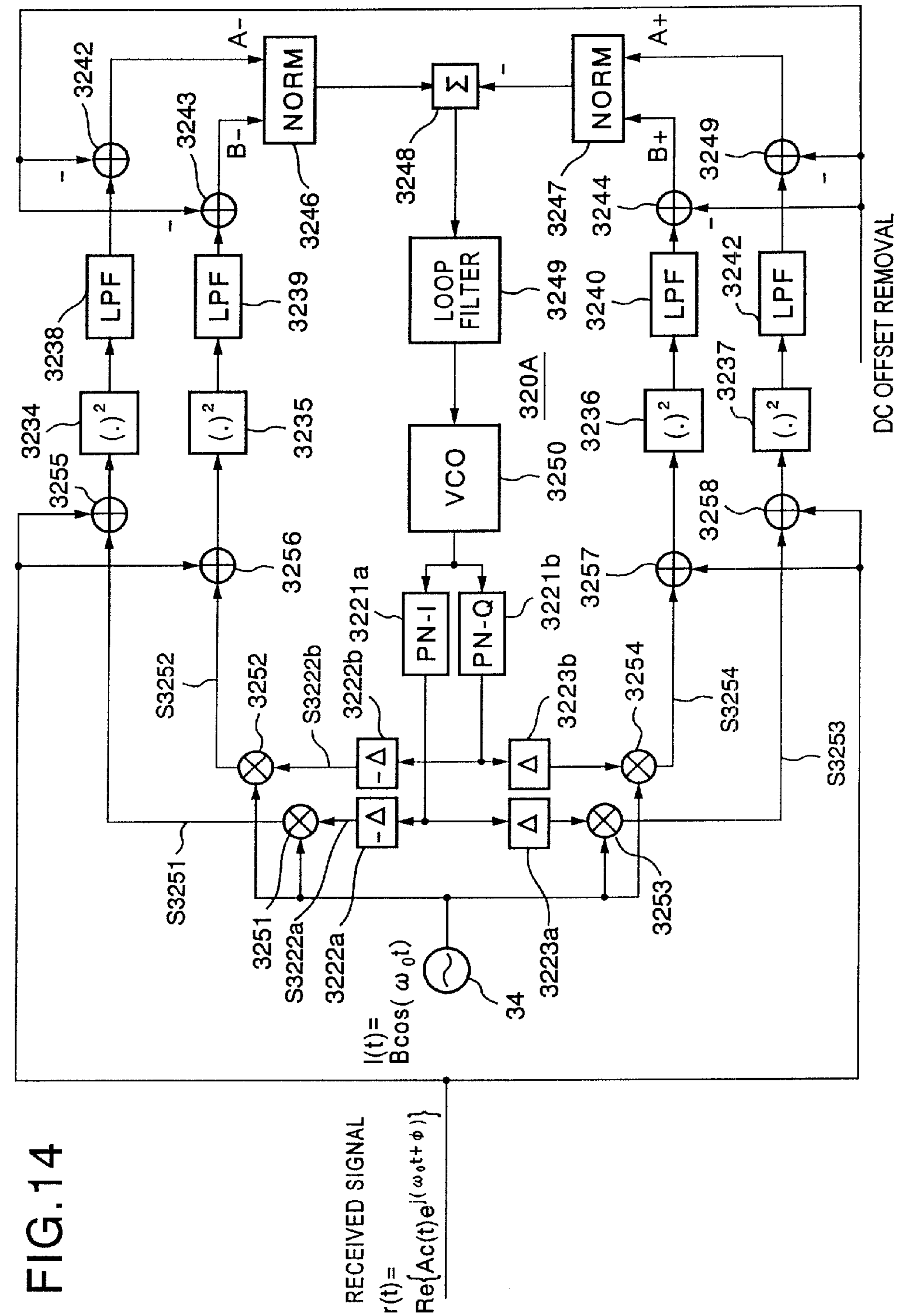
FIG. 14 is a view of another example of the configuration of a PN code tracking circuit of FIG. 11 without carrier phase shifters.

FIG. 14 is a view of another example of the configuration of a PN code tracking circuit of FIG. 11 without carrier phase shifters.

In FIG. 14, the multipliers 3251 and 3252 are provided instead of the QPSK modulator 3224 of FIG. 13. The multiplier 3251 multiplies the local signal l(t) by the output signal S3222*a* of the phase adjusting circuit 3222*a*. The multiplier 3252 multiplies the local signal l(t) by the output signal S3222*b* of the phase adjusting circuit 3222*b*.

Similarly, in FIG. 14, the multipliers 3253 and 3254 are provided instead of the QSPK modulator 3225 of FIG. 13. The multiplier 3253 multiplies the local signal l(t) by the output signal S3223*a* of the phase adjusting circuit 3223*a*. The multiplier 3254 multiplies the local signal l(t) by the output signal S3223*b* of the phase adjusting circuit 3223*b*.

Further, in FIG. 14, adders 3255 and 3256 are provided instead of the phase shifter 3226 and 3227 and adders 3230 and 3231 of FIG. 13. The adder 3255 adds the received signal r(t) and an output signal S3251 of the multiplier 3251. The adder 3256 adds the received signal r(t) and an output signal S3252 of the multiplier 3252.

Further, in FIG. 14, adders 3257 and 3258 are provided instead of the phase shifters 3228 and 3229 and adders 3232 and 3233 of FIG. 13. The adder 3257 adds the received signal r(t) and an output signal S3254 of the multiplier 3254. The adder 3258 adds the received signal r(t) and an output signal S3253 of the multiplier 3253.

According to this configuration of FIG. 14, the signal at the point A– (output of the subtractor 3242) is given by the following:

$$\begin{aligned} &AB\mathrm{Re}\{\overline{c_I(t-\Delta)c(t)}e^{j\phi}\} = \\ &AB(\overline{c_I(t-\Delta)c_I(t)}\cos\phi-\overline{c_I(t-\Delta)c_Q(t)}\sin\phi)\cong \\ &AB\overline{c_I(t-\Delta)c_I(t)}\cos\phi \end{aligned} \tag{37}$$

where the approximation is based on the in-phase and quadrature codes $c_I(t)$ and $c_Q(t)$ having a low cross correlation. Similarly the signal at B– (output of the subtractor 3243) can be computed as follows:

$$\begin{aligned} &AB\mathrm{Re}\{\overline{c_Q(t-\Delta)c(t)}e^{j\phi}\} = \\ &AB(\overline{c_Q(t-\Delta)c_I(t)}\cos\phi-\overline{c_Q(t-\Delta)c_Q(t)}\sin\phi)\cong \\ &-AB\overline{c_Q(t-\Delta)c_Q(t)}\sin\phi \end{aligned} \tag{38}$$

Now if considering the signals at A– and B–, there is no value of the phase $\phi$ which makes both of them vanish. If $|\cos\phi|$ vanishes, then $|\mathrm{si}\Phi|$ is maximum and vice-versa. In the same manner as above. it is possible to compute the two corresponding signals for the lower branch of the circuit as follows:

$$\begin{aligned} &AB\mathrm{Re}\{\overline{c_I(t+\Delta)c(t)}e^{j\phi}\} = \\ &AB(\overline{c_I(t+\Delta)c_I(t)}\cos\phi-\overline{c_I(t+\Delta)c_Q(t)}\sin\phi)\cong \\ &AB\overline{c_I(t+\Delta)c_I(t)}\cos\phi \end{aligned} \tag{39}$$

$$\begin{aligned} &AB\mathrm{Re}\{\overline{c_Q(t+\Delta)c(t)}e^{j\phi}\} = \\ &AB(\overline{c_Q(t+\Delta)c_I(t)}\cos\phi-\overline{c_Q(t+\Delta)c_Q(t)}\sin\phi)\cong \\ &-AB\overline{c_Q(t+\Delta)c_Q(t)}\sin\phi \end{aligned} \tag{40}$$

The signals at A–, B–, A+, and B+ may be processed as indicated in FIG. 14. However it may be desirable to replace the two "Norm" blocks (norm circuit 3246, 3247) and the adder (or subtractor) with a more generalized block that may have better performance in the presence of noise in the loop, D.C. offsets, and other imperfections.

Figure 15:
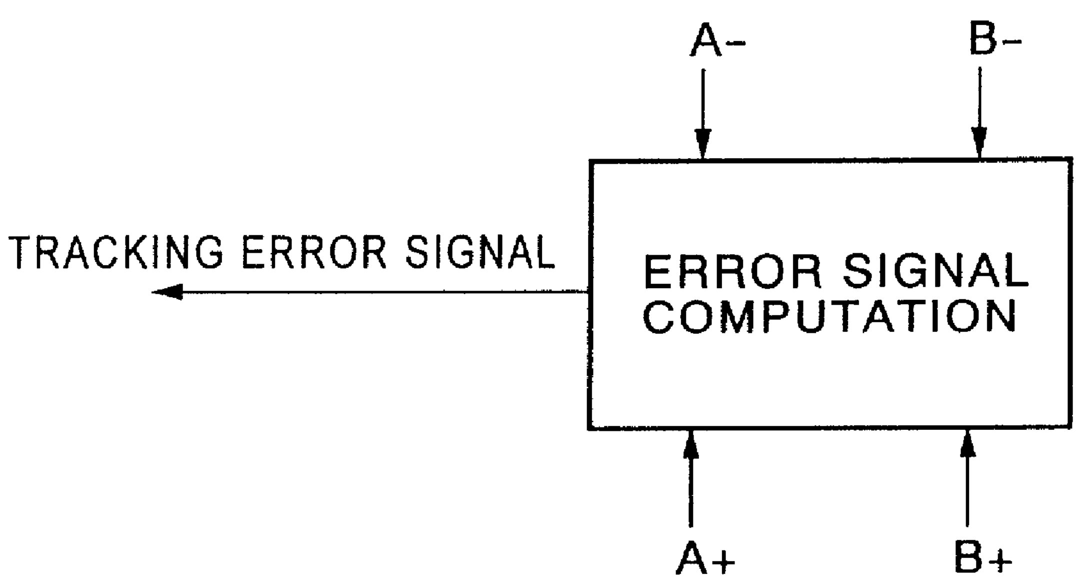
FIG. 15 is an explanatory view of the generalized error signal computation.

The generalized block shown in FIG. 15 can be utilized. In this case, the algorithm to compute the error signal can account for any imperfections and even adapt to changing characteristics of the analog circuit components.

Figure 16:
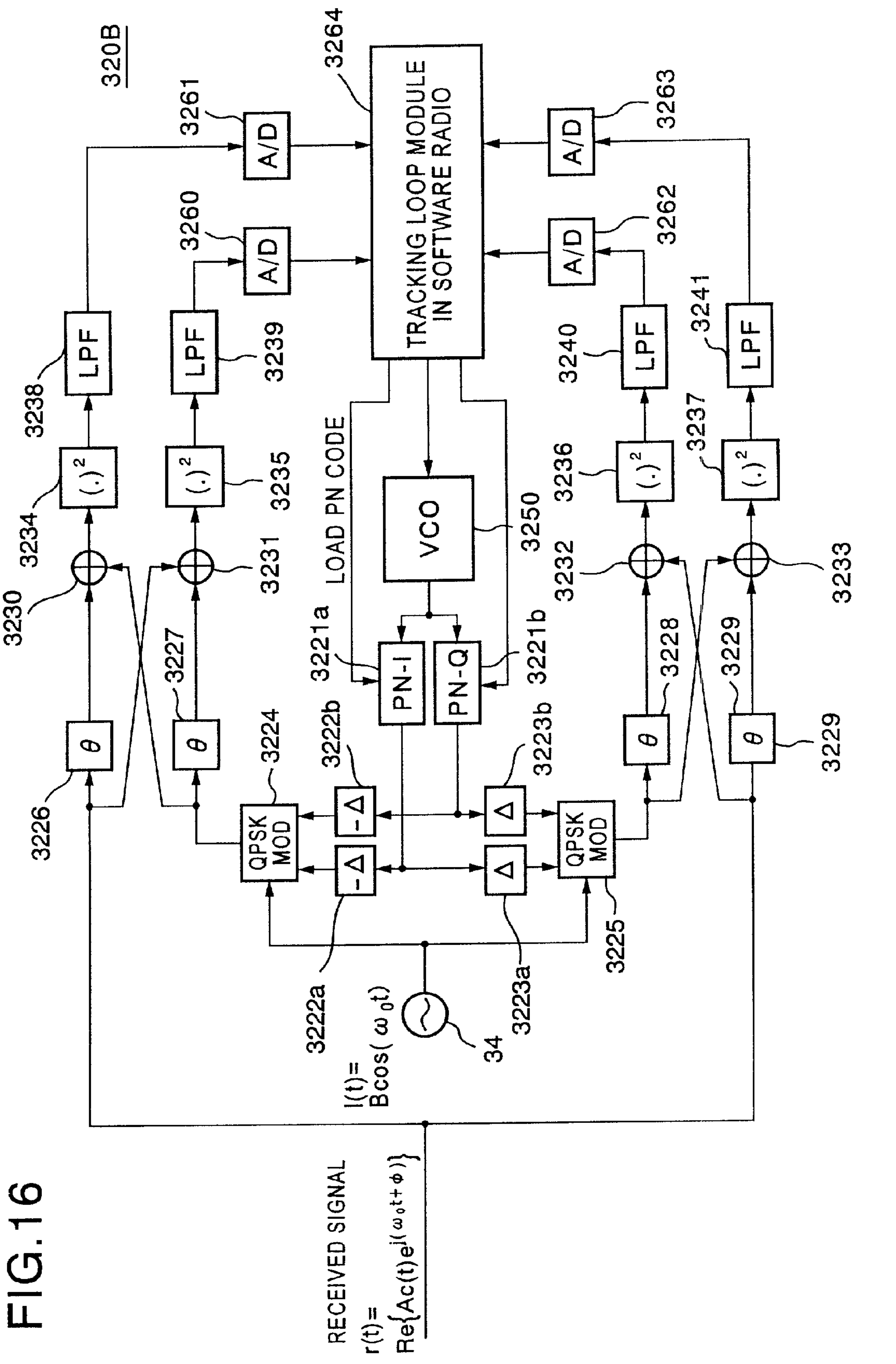
FIG. 16 is a view of another example of the configuration of a PN code tracking circuit of FIG. 11 for a software radio.

FIG. 16 is a view of another example of the configuration of a PN code tracking circuit of FIG. 11 for a software radio.

The point of difference of the circuit 320B of FIG. 16 from the circuit of FIG. 13 is that A/D converters 3260, 3261, 3262, and 3263 are provided with outputs of the LPFs 3238, 3239, 3240, and 3241 and a digital processor 3264, that is, part of the generated software radio architecture, instead of the D.C. removal use subtractors 3242 to 3245, norm circuit 3246 and 3247, the summing circuit 3248, and the loop filter 3249 of FIG. 13.

The architecture for the various DS/SS tracking circuits discussed so far contains a part that operates at RF frequencies and a part that operates at lower frequencies. The low frequency part can be realized digitally in order to achieve flexibility in the operation of the tracking circuit in different environments of interference and different cases of frequency offset and D.C. offsets introduced by the circuits.

Such a modification can also give rise to a faster locking process. Thus the design of an optimized acquisition circuit and tracking circuit can be included in one unit.

Accordingly, in the PN code tracking circuit 320B, A/D converters 3260 to 3263 are provided after the LPSs (low pass filters) 3238 to 3241. Further, as mentioned above, the D.C. removal use subtractors 3242 to 3245, norm circuits 3246 and 3247, summing circuit 3248, and tracking loop filter 3249 of FIG. 13 are then all incorporated in a digital processor 3264, that is, part of the general software radio architecture. It can be a software module in such an architecture.

Further, the direct conversion circuit 210 and 210A of FIG. 3, and FIG. 4 can take on alternative forms involving the basic principle of power detection using an FET device (refer to above mentioned document [1]). All of these forms will have at least two inputs (the received signal and a local reference signal) and at least two output signals. Each of the outputs will consist of the (low-pass filtered) power signal of the sum of the input signals with one input signal being phase shifted with respect to the other by the angle θ. The output signals contain sufficient information to enable the extraction of the in-phase and quadrature components of the received signal r(t). A four port circuit will have the form as shown in FIG. 17 where the outputs are basically low-pass filtered (e.g. RC filter) signal powers at the FET outputs.

Figure 17:
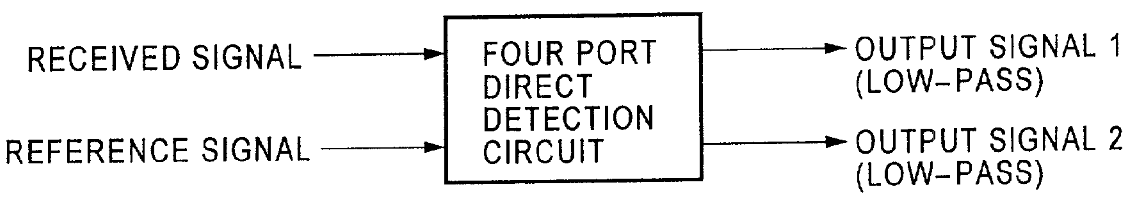
FIG. 17 is a view of a generalized four-port direct conversion circuit.
Figure 18:
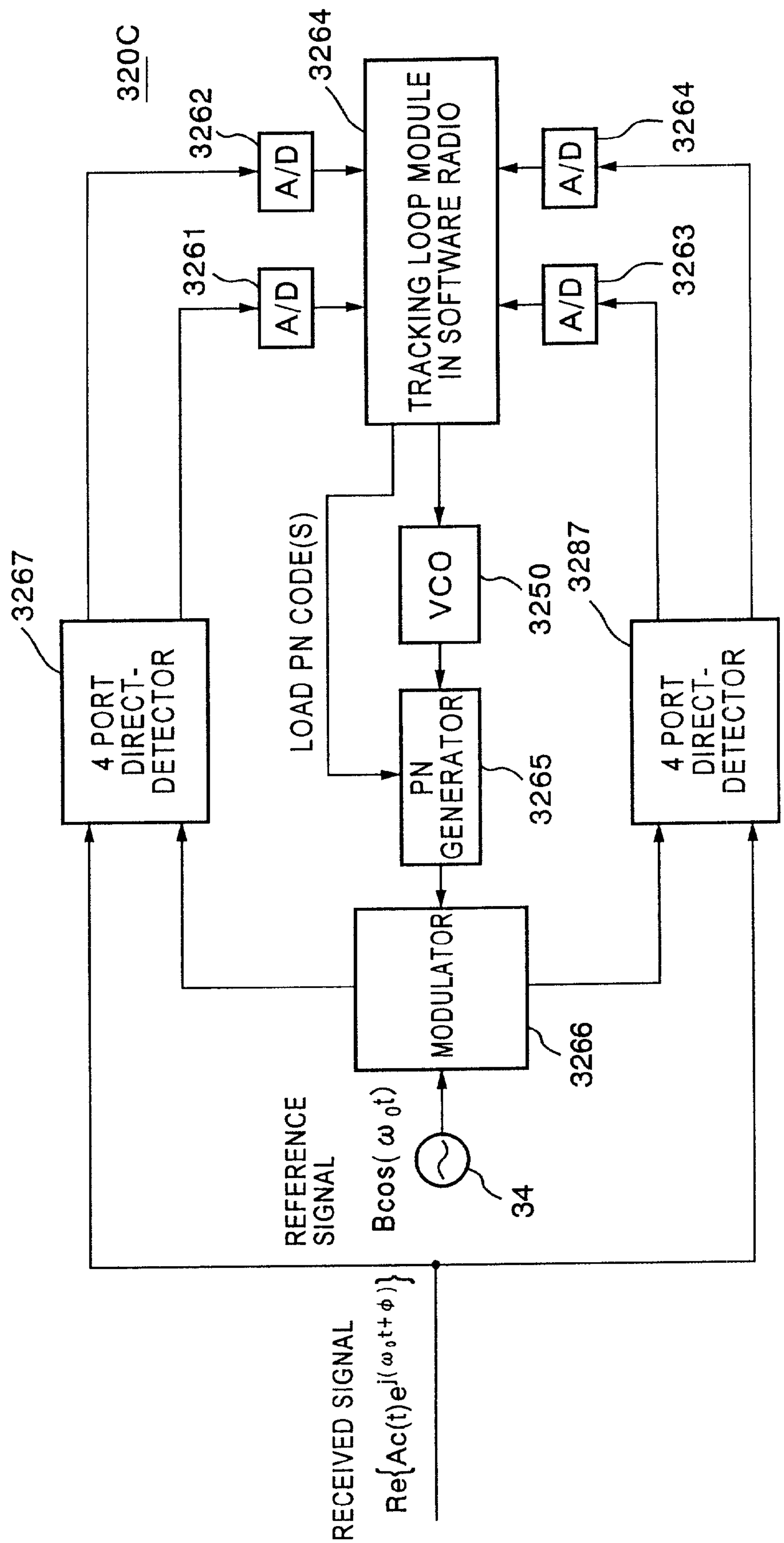
FIG. 18 is a view of the generalized PN code tracking circuit for a software radio.

Based on the generalized four-port direct conversion circuit of FIG. 17, it is possible to design a generalized PN code tracking circuit as shown in FIG. 18.

In FIG. 18, 3265 denotes a PN code generator, 3266 denotes a modulator, and 3267 and 3208 denote four-port direct conversion circuits.

For example, the modulator 3266 includes the phase adjusting circuit 3222*a*, 3222*b*, 3223*a*, and 3223*b* and the QPSK modulators 3224 and 3225 of FIG. 13, while the four-port direct conversion circuit 3267 includes the phase shifters 3226, 3227, adders 3233, 3231, square-law detectors 3234, 3235, and LPFs 3238, 3339 of FIG. 13.

Similarly, the four-port direct conversion circuit 3268 includes the phase shifters 3228, 3229, adders 3232, 3233, square-law detectors 3236, 3237, and LPFs 3240, 3241.

The circuits in FIG. 16 and FIG. 18, can be used for both PN code acquisition and tracking by the appropriate design of the algorithm in the software module (digital processor). For PN code acquisition, the module can output a sequence of error signal that effective steps the frequency of the VCO 3250 through a sequence of frequencies that ultimately bring the local PN code into alignment with the received PN code. In any acquisition and tracking circuit, an important parameter is the bandwidth of the filter at the output of the square-law detectors 3234 to 3237, or at the input to the A/D converters 3260 to 3263.

This bandwidth effectively determines an equivalent integration time. An optimum acquisition circuit should have an integration time that depends on the SNR of the received signal r(t). It is possible to design the four-port direct detection circuits with a fixed bandwidth (fixed RC filter at the FET output) and then realize further filtering digitally in the software module. The actual algorithm for the software module will depend on the PN code length, the SNR of the received signal, and clock frequency uncertainty at the beginning of the acquisition process.

In the embodiment, circuits for the direct detection and PN code synchronization for direct sequence spread spectrum signals were explained. These circuits are based on the use of recently developed wide-band direct detection FET based circuits that exhibit a high degree of linearity. The circuits described in this embodiment effectively allow the analog realization of the despreading function in a spread spectrum. Such a realization results in the receiver complexity being independent of the PN code spreading clock frequency. The resulting circuits are significant in the design of future wide-band spread spectrum receivers for systems such as 3G WCDMA and beyond.

Namely, according to the present embodiment, circuits for the analog despreading and direct conversion of a direct sequence RF spread spectrum signal based on FET wide-band direct-converter circuits are presented. The circuits enable the design of power efficient spread spectrum systems with a very high chip rate, where the complexity of the circuit is independent of the chip rate. The use of these circuits will solve a problem in the current state of the art, that is, realization of a spread spectrum where power consumption increases with the chip rate.

Further, in this embodiment, circuits for the PN code synchronization and despreading for different types of direct sequence spread spectrum are presented. These circuits enable the design of software radio receivers where the digital processing in the receiver is performed at the data symbol rate (or at a small multiple of the symbol rate) instead of the chip rate which is customary in state-of-the art realization of modern direct sequence spread spectrum receivers.

In these circuits, the chip rate is only limited by the bandwidth and linearity of the FET based direct detector circuit. The recent development of FETs based direct detectors with very wide bandwidth and large dynamic ranges enables the realization of the proposed approach to direct sequence spread spectrum receiver design proposed here.

Accordingly, the present invention will allow greatly simplified receiver designs for spread spectrum and CDMA systems, including the realization of low-cost information processing devices to attach to the Internet. Spread spectrum systems are typically limited in spreading bandwidth due to the receiver complexity. The present invention will greatly extend the bandwidth limit for these systems.

Figure 19:
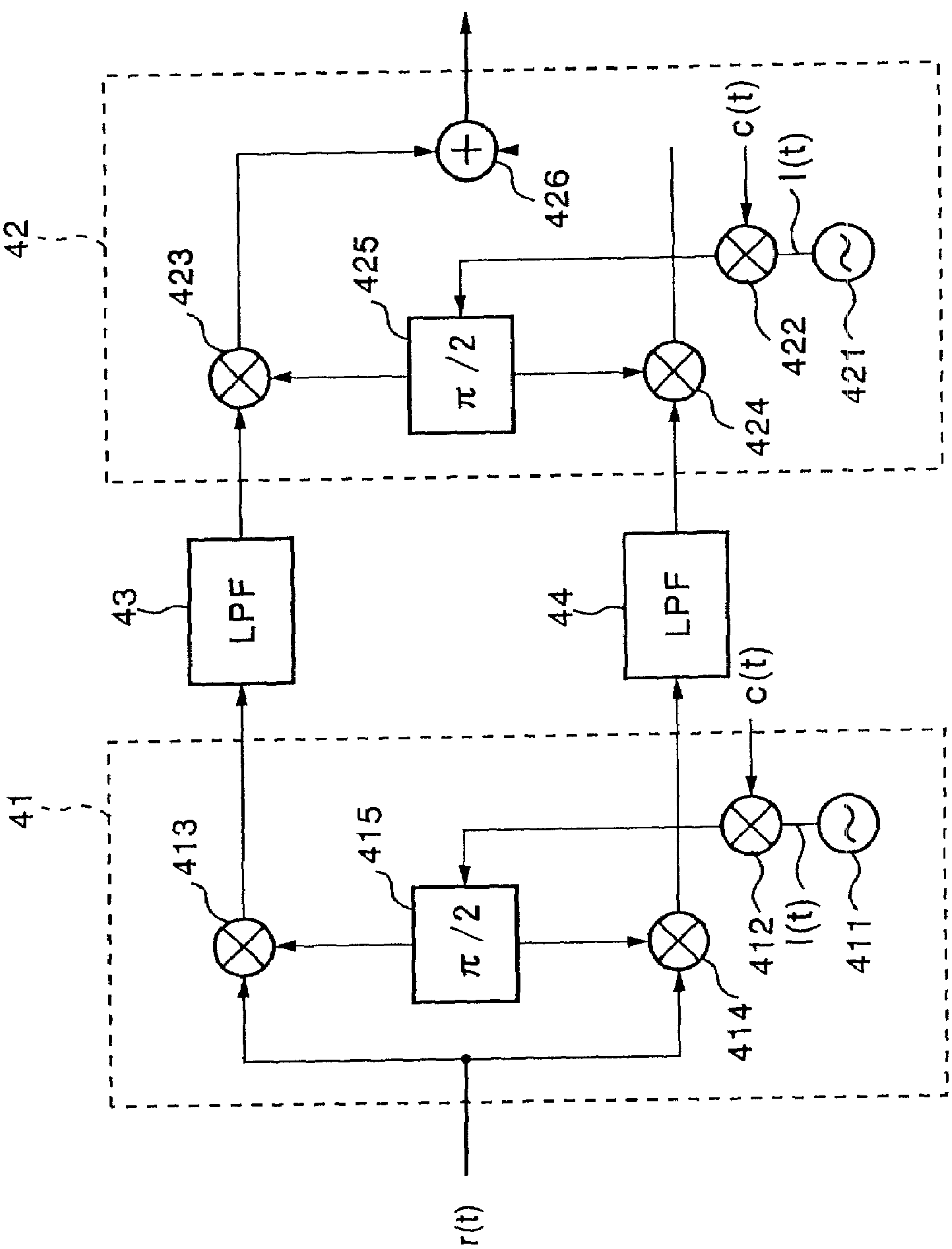
FIG. 19 is a view of another type of the direct conversion circuit according to the present invention.

Note that, in the present invention, n-port devices were explained as examples of the despreading use direct conversion circuit, however, the present invention can be applied to other types of direct conversion circuits, for example, shown in FIG. 19 (for example, refer to Japanese Unexamined Patent Publication (Kokai) No. 11-317777).

The direct conversion circuit 40 of FIG. 19 comprises a quadrature demodulator 41, a quadrature modulator 42, and LPFs 43 and 44.

The quadrature demodulator 41 consists of a local oscillator 411, multipliers 412, 413, and 414, and a phase shifter (π/2 shifter) 415.

In the quadrature demodulator 41, the multiplier 412 multiplies a local signal l(t) by a PN code c(t).

Further the quadrature modulator 42 is constituted by a local oscillator 421, multipliers 422, 423, and 424, a phase shifter 415, and an adder 416.

In the quadrature modulator 42, the multiplier 422 multiplies a local signal l(t) by a PN code c(t) While the invention has been described with reference to specific embodiments chosen for the purpose of illustration, it should be apparent that numerous modifications could be made thereto by those skilled in the art without departing from the basic concept and scope of the invention.

As described above, according to the spread spectrum receiver, the spread spectrum receiver employs circuits 21, 31 based on direct conversion techniques. These circuits allow the realization of spread spectrum receivers of greatly reduced complexity and of much higher chip rates than can be realized with the standard approach of a fully digital receiver. With these circuits, the digital processing at the receiver is performed at the data symbol rate and not at a multiple of the chip rate that is customary in state-of-the-art spread spectrum and CDMA receiver designs.

Note that the present invention is not limited to the above embodiments and includes modifications within the scope of the claims.

What is claimed is:

1. A spread spectrum receiver receiving a spread spectrum signal spread in bandwidth by a predetermined spreading code, comprising:

- a local oscillator for outputting a local signal with a predetermined frequency,
- a local spreading code generating means for generating a local spreading code according to the spreading code of the received signal, and
- a direct conversion circuit for generating a reference local signal based on the local signal from the local oscillator and the local spreading code from the local spreading generating means, generating two signals having a phase difference based on the received signal and the reference local signal, and despreading based on two signals having a phase difference;

wherein the direct conversion circuit comprises:

- a multiplier for multiplying the local signal by the local spreading code and outputting the same as the reference local signal,
- a first phase shifter for shifting the received signal in phase,
- a second phase shifter for shifting the reference local signal in phase,
- a first adder for adding the reference local signal and an output signal of the first shifter,
- a second adder for adding the received signal and an output signal of the second phase shifter,
- a first detector for detecting a signal level of an output of the first adder, and
- a second detector for detecting a signal level of an output of the second adder.

2. A spread spectrum receiver as set forth in claim 1, wherein the direct conversion circuit further comprises:

- a first filter for performing a predetermined filtering processing with respect to an output signal of the first detector and
- a second filter for performing a predetermined filtering processing with respect to an output signal of the second detector.

3. A spread spectrum receiver as set forth in claim 1, wherein the direct conversion circuit further comprises:

- a third detector for detecting a signal level of the received signal.

4. A spread spectrum receiver as set forth in claim 3, wherein

- a first filter for performing a predetermined filtering processing with respect to an output signal of the first detector,
- a second filter for performing a predetermined filtering processing with respect to an output signal of the second detector, and
- a third filter for performing a predetermined filtering processing with respect to an output signal of the third detector.

5. A spread spectrum receiver as set forth in claim 1, wherein the direct conversion circuit comprises:

- a modulator for modulating the local signal by the local spreading code and outputting the same as the reference local signal,
- a first phase shifter for shifting the received signal in phase,
- a second phase shifter for shifting the reference local signal in phase,
- a first adder for adding the reference local signal and an output signal of the first shifter,
- a second adder for adding the received signal and an output signal of the second phase shifter,
- a first detector for detecting a signal level Of an output of the first adder, and
- a second detector for detecting a signal level of an output of the second adder.

6. A spread spectrum receiver as set forth in claim 5, wherein the direct conversion circuit further comprises:

- a first filter for performing a predetermined filtering processing with respect to an output signal of the first detector and
- a second filter for performing a predetermined filtering processing with respect to an output signal of the second detector.

7. A spread spectrum receiver as set forth in claim 5, wherein the direct conversion circuit further comprises:

- a third detector for detecting a signal level of the received signal.

8. A spread spectrum receiver as set forth in claim 7, wherein the direct conversion circuit further comprises:

- a first filter for performing a predetermined filtering processing with respect to an output signal of the first detector,
- a second filter for performing a predetermined filtering processing with respect to an output signal of the second detector, and
- a third filter for performing a predetermined filtering processing with respect to an output signal of the third detector.

9. A spread spectrum receiver as set forth in claim 5, wherein the modulator comprises a quadrature modulator.

10. A spread spectrum receiver as set forth in claim 1, wherein the spreading code included in the reference Local signal is synchronized to the spreading code of the received signal.

11. A spread spectrum receiver as set forth in claim 1, wherein the carrier frequency of the received signal is approximately equal to the carrier frequency of the reference local signal.

12. A spread spectrum receiver as set forth in claim 1, wherein at least one of a first detector and second selector comprises a square-law detector.

13. A spread spectrum receiver as set forth in claim 3, wherein at least one of the first, second, and third detectors comprises a square-law detector.

14. A spread spectrum receiver as set forth in claim 5, wherein at least one of the first detector and second selector comprises a square-law detector.

15. A spread spectrum receiver as set forth in claim 7, wherein at least one of the first, second, and third detectors comprises a square-law detector.

16. A spread spectrum receiver receiving a spread spectrum signal spread in bandwidth by a predetermined spreading code, comprising:

a local oscillator for outputting a local signal with a predetermined frequency, a local spreading code tracking means for generating a local spreading code through a process of synchronization and tracking based on the received signal and local signal from local oscillator, and a direct conversion circuit for generating a reference local signal based on the local signal from the local oscillator and the local spreading code from the local spreading tracking means, generating two signals having a phase difference based on the received signal and the reference local signal, and despreading based on two signals having a phase difference;

wherein the local spreading code tracking means comprises:

a local spreading code generator for generating the local spreading code based on a value of a control signal, a first phase adjusting means for delaying the generated local spreading code by a predetermined time, a second phase adjusting means for advancing the generated local spreading code by a predetermined time, a first multiplier for multiplying the local signal by an output of the first phase adjusting means, a second multiplier for multiplying the local signal by an output of the second phase adjusting means, a first adder for adding the received signal and an output of the first multiplier, a first detector for detecting an amplitude component of an output signal of the first adder, a first envelope detecting means for detecting a first envelope of an output signal of the first detector, a second adder for adding the received signal and an output of the second multiplier, a second detector for detecting an amplitude component of an output signal of the second adder, a second envelope detecting means for detecting a second envelope of an output signal of the second detector, and a control signal generating means for generating the control signal so as to reduce the difference between the first envelope and second envelope close to zero.

17. A spread spectrum receiver as set forth in claim 16, wherein the local spreading code tracking means compnses:

a local spreading code generator for generating the local spreading code based on a value of a control signal, a first phase adjusting means for delaying the generated local spreading code by a predetermined time, a second phase adjusting means for advancing the generated local spreading code by a predetermined time, a first multiplier for multiplying the local signal by an output of the first phase adjusting means, a second multiplier for multiplying the local signal by an output of the second phase adjusting means, a first phase shifter for shifting the received signal in phase, a second phase shifter for shifting an output signal of the first multiplier in phase, a third phase shifter for shifting an output signal of the second multiplier in phase, a fourth phase shifter for shifting the received signal in phase, a first adder for adding an output signal of the first phase shifter and the output of the first multiplier, a second adder for adding the received signal and an output signal of the second phase shifter, a third adder for adding the received signal and an output signal of the third phase shifter, a fourth adder for adding the output signal of the second multiplier and an output signal of the fourth phase shifter, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first norm circuit for computing a first norm based on outputs of the first and second filters, a second norm circuit for computing a second norm based on outputs of the third and fourth filters, and a control signal generating means for generating the control signal so as to reduce the difference between the first norm and second norm close to zero.

18. A spread spectrum receiver as set fourth in claim 17, wherein at least one of the first, second, third, and fourth detectors comprises a square-law detector.

19. A spread spectrum receiver as set fourth in claim 17, wherein the spreading code tracking means further comprises:

a means for removing D.C. offset from outputs of the first, second, third, and fourth filter.

20. A spread spectrum receiver as set forth in claim 16, wherein the local spreading code tracking means compnses:

a first local spreading code generator for generating an in-phase local spreading code based on a value of a control signal, a second local spreading code generator for generating a quadration local spreading code based on the value of a control signal, a first phase adjusting means for delaying the generated in-phase and quadration local spreading codes by a predetermined time, a second phase adjusting means for advancing the generated i.,,-phase and quadratic, local spreading codes by a predetermined time, a first quadrature modulator for modulating the local signal by output signals of the first phase adjusting means, a second quadrature modulator for modulating the local signal by output signals of the second phase adjusting means, a first phase shifter for shifting the received signal in phase, a second phase shifter for shifting an output signal of the first quadrature modulator in phase, a third phase shifter for shifting an output signal of the second quadrature modulator in phase, a fourth phase shifter for shifting the received signal in phase, a first adder for adding an output signal of the first phase shifter and the output of the first quadrature modulator, a second adder for adding the received signal and an output signal of the second phase shifter, a third adder for adding the received signal and an output signal of the third phase shifter, a fourth adder for adding the output signal of the second quadrature modulator and an output signal of the fourth phase shifter, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first norm circuit for computing a first norm based on outputs of the first and second filters, a second norm circuit for computing a second norm based on outputs of the third and fourth filters, and a control signal generating means for generating the control signal so as to reduce the difference between the first norm and second norm close to zero.

21. A spread spectrum receiver as set fourth in claim 20, wherein at least one of the first, second, third, and fourth detectors comprises a square-law detector.

22. A spread spectrum receiver as set fourth in claim 20, wherein the spreading code tracking means further comprises:

a means for removing D.C. offset from outputs of the first, second, third, and fourth filters.

23. A spread spectrum receiver as set forth in claim 16, wherein the local spreading code tracking means compnses:

a first local spreading code generator for generating an in-phase local spreading code based on a value of a control signal, a second local spreading code generator for generating a quadration local spreading code based on the value of a control signal, a first phase adjusting means for delaying the generated in-phase local spreading code by a predetermined time, a second phase adjusting means for delaying the generated quadration local spreading code by a predetermined time, a third phase adjusting means for advancing the generated in-phase local spreading code by a predetermined time, a fourth phase adjusting means for advancing the generated quadration local spreading code by a predetermined time, a first multiplier for multiplying the local signal by an output signal of the first phase adjusting means, a second multiplier for multiplying the local signal by an output signal of the second phase adjusting means, a third multiplier for multiplying the local signal by an output signal of the third phase adjusting means, a fourth multiplier for multiplying the local signal by an output signal of the fourth phase adjusting means, a first adder for adding the received signal and an output signal of the first multiplier, a second adder for adding the received signal and an output signal of the second multiplier, a third adder for adding the received signal and an output signal of the third multiplier, a fourth adder for adding the received signal and an output signal of the fourth multiplier, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first norm circuit for computing a first norm based on outputs of the first and second filters, a second norm circuit for computing a second norm based on outputs of the third and fourth filters, and a control signal generating means for generating the control signal so as to reduce the difference between the first norm and second norm close to zero.

24. A spread spectrum receiver as set fourth in claim 23, wherein at least one of the first, second, third, and fourth detectors comprises a square-law detector.

25. A spread spectrum receiver as set fourth in claim 23, wherein the spreading code tracking means further comprises:

a mean for removing D.C. offset from outputs of the first, second, third, and fourth filters.

26. A spread spectrum receiver as set forth in claim 16, wherein the direct conversion circuit comprises:

a multiplier for multiplying the local signal by the local spreading code and outputting the sane as the reference local signal, a first phase shifter for shifting the received signal in phase, a second phase shifter for shifting the reference local signal in phase, a first adder for adding the reference local signal and an output signal of the first shifter, a second adder for adding the received signal and an output signal of the second phase shifter, a first detector for detecting a signal level of an output of the first adder, and a second detector for detecting a signal level of an output of the second adder.

27. A spread spectrum receiver as set forth in claim 26, wherein the direct conversion circuit further comprises:

a first filter for performing a predetermined filtering processing with respect to an output signal of the first detector, and a second filter for performing a predetermined filtering processing with respect to an output signal of the second detector.

28. A spread spectrum receiver as set forth in claim 26, wherein the direct conversion circuit further comprises:

a third detector for detecting a signal level of the received signal.

29. A spread spectrum receiver as set forth in claim 28, wherein the direct conversion circuit further comprises:

a first filter for performing a predetermined filtering processing with respect to an output signal of the first detector, a second filter for performing a predetermined filtering processing with respect to an output signal of the second detector, and a third filter for performing a predetermined filtering processing with respect to an output signal of the third detector.

30. A spread spectrum receiver as set forth in claim 17, wherein the direct conversion circuit comprises:

a quadrature modulator for modulating the local signal by the in-phase and quadration local spreading codes and outputting the same as the reference local signal, a first phase shifter for shifting the received signal in phase, a second phase shifter for shifting the reference local signal in phase, a first adder for adding the reference local signal and an output signal of the first shifter, a second adder for adding the received signal and an output signal of the second phase shifter, a first detector for detecting a signal level Of an output of the first adder, and a second detector for detecting a signal level of an output of the second adder.

31. A spread spectrum receiver as set forth in claim 30, wherein the direct conversion circuit further comprises:

a first filter for performing a predetermined filtering processing with respect to an output signal of the first detector and a second filter for performing a predetermined filtering processing with respect to an output signal of the second detector.

32. A spread spectrum receiver as set forth in claim 30, wherein the direct conversion circuit further comprises:

a third detector for detecting a signal level of the received signal.

33. A spread spectrum receiver as set forth in claim 32, wherein the direct conversion circuit further comprises:

a first filter for performing a predetermined filtering processing with respect to an output signal of the first detector, a second filter for performing a predetermined filtering processing with respect to an output signal of the second detector, and a third filter for performing a predetermined filtering processing with respect to an output: signal of the third detector.

34. A spread spectrum receiver as set forth in claim 16, wherein the spreading code included in the reference local signal is synchronized to the spreading code of the received signal.

35. A spread spectrum receiver as set forth in claim 16, wherein the carrier frequency of the received signal is approximately equal to the carrier frequency of the reference local signal.

36. A spread spectrum receiver for software radio receiving a spread spectrum signal spread in bandwidth by a predetermined spreading code, comprising:

a local oscillator for outputting a local signal with a predetennined frequency, a local spreading code tracking means for generating a local spreading code through a process, including digital processing, of synchronization and tracking based on the received signal and the local signal from the local oscillator, and a direct conversion circuit for generating a reference local signal based on the local signal from the local oscillator and the local spreading code from the local spreading tracking means, generating two signals having a phase difference based on the received signal and the reference local signal, and despreading based on the two signals having a phase difference;

wherein the local spreading code tracking means comprises:

a first local spreading code generator for generating an in-phase local spreading code based on a value of a control signal, a second local spreading code generator for generating a quadration local spreading code based on the value of a control signal, a first phase adjusting means for delaying the generated in-phase and ciuadration local spreading codes by a predetermined time, a second phase adjusting means for advancing the generated in-phase and ciuadration local spreading codes by a predetermined time, a first quadrature modulator for modulating the local signal by an output signals of the first phase adjusting means, a second quadrature modulator for modulating the local signal by an output signal of the second phase adjusting means, a first phase shifter for shifting the received signal in phase, a second phase shifter for shifting an output signal of the first quadrature modulator :in phase, a third phase shifter for shifting an output signal of the second quadrature modulator in phase, a fourth phase shifter for shifting the received signal in phase, a first adder for adding an output signal of the first phase shifter and the output of the first quadrature modulator, a second adder for adding the received signal and an output signal of the second phase shifter, a third adder for adding the received signal and an output signal of the third phase shifter, a fourth adder for adding the output signal of the second quadrature modulator and an output signal of the fourth phase shifter, a first detector for detecting a signal level of an output of the first adder, a second detector for detecting a signal level of an output of the second adder, a third detector for detecting a signal level of an output of the third adder, a fourth detector for detecting a signal level of an output of the fourth adder, a first filter for performing a predetermined filtering processing with respect to an output of a first detector, a second filter for performing a predetermined filtering processing with respect to an output of a second detector, a third filter for performing a predetermined filtering processing with respect to an output of a third detector, a fourth filter for performing a predetermined filtering processing with respect to an output of a fourth detector, a first analog to digital (A/D) converting means for converting output analog signals of the first and second filters to digital signals, a second A/D converting means for converting outputs analog signals of the third and fourth filters to digital signals, and a digital processing means for generating the control signal so as to reduce the difference between the outputs of the first A/D converting means and second A/D converting means close to zero.

37. A spread spectrum receiver as set forth in claim 36, wherein at least one of the first, second, third, and fourth detectors comprises a square-law detector.

* * * * *